(12) United States Patent
Takii

(10) Patent No.: US 10,449,851 B2
(45) Date of Patent: Oct. 22, 2019

(54) WORK VEHICLE

(71) Applicant: Yanmar Co., Ltd., Osaka-shi, Osaka-fu (JP)

(72) Inventor: Daisuke Takii, Osaka (JP)

(73) Assignee: YANMAR CO., LTD., Osaka (JP)

( * ) Notice: Subject to any disclaimer, the term of this patent is extended or adjusted under 35 U.S.C. 154(b) by 49 days.

(21) Appl. No.: 15/749,372

(22) PCT Filed: Jul. 28, 2016

(86) PCT No.: PCT/JP2016/003491
§ 371 (c)(1),
(2) Date: Jan. 31, 2018

(87) PCT Pub. No.: WO2017/022217
PCT Pub. Date: Feb. 9, 2017

(65) Prior Publication Data
US 2018/0222313 A1    Aug. 9, 2018

(30) Foreign Application Priority Data

Jul. 31, 2015 (JP) ................................. 2015-152042
Jul. 31, 2015 (JP) ................................. 2015-152059
(Continued)

(51) Int. Cl.
*F01N 3/021* (2006.01)
*F01N 13/00* (2010.01)
(Continued)

(52) U.S. Cl.
CPC ............ *B60K 13/04* (2013.01); *F01N 13/008* (2013.01); *B60Y 2200/221* (2013.01);
(Continued)

(58) Field of Classification Search
CPC ..... F01N 3/021; F01N 13/008; F01N 2560/08
See application file for complete search history.

(56) References Cited

U.S. PATENT DOCUMENTS

| | | | |
|---|---|---|---|
| 2011/0000199 A1* | 1/2011 | Ezawa | B01D 46/0002 60/311 |
| 2014/0251713 A1 | 9/2014 | Aoyama et al. | |

(Continued)

FOREIGN PATENT DOCUMENTS

| | | |
|---|---|---|
| EP | 3208125 A1 | 8/2017 |
| EP | 3208126 A1 | 8/2017 |

(Continued)

OTHER PUBLICATIONS

International Search Report dated Oct. 11, 2018 issued in corresponding PCT Application PCT/JP2016/003491.
(Continued)

*Primary Examiner* — Audrey K Bradley
(74) *Attorney, Agent, or Firm* — Norton Rose Fulbright US LLP

(57) ABSTRACT

A work vehicle such as a tractor including an engine and a fan shroud. The engine includes a diesel particulate filter (DPF) for purifying exhaust gas. The fan shroud is disposed ahead of the engine. The DPF includes a soot filter for collecting PM (particulate matter) in exhaust gas. The engine further includes a pressure difference sensor for detecting a pressure difference between an upstream side and a downstream side of the soot filter of the DPF in a direction in which exhaust gas flows. The pressure difference sensor is supported by the fan shroud.

10 Claims, 20 Drawing Sheets

(30) Foreign Application Priority Data

Jul. 31, 2015 (JP) .................................. 2015-152063
Jul. 31, 2015 (JP) .................................. 2015-152065

(51) Int. Cl.
    *F01N 13/18*     (2010.01)
    *B60K 13/04*     (2006.01)
    *B62D 25/10*     (2006.01)

(52) U.S. Cl.
    CPC .............. *B62D 25/10* (2013.01); *F01N 3/021* (2013.01); *F01N 13/0097* (2014.06); *F01N 13/1805* (2013.01); *F01N 2560/06* (2013.01); *F01N 2560/08* (2013.01); *F01N 2590/08* (2013.01); *F01N 2900/1404* (2013.01)

(56) References Cited

U.S. PATENT DOCUMENTS

| | | | | |
|---|---|---|---|---|
| 2014/0360172 | A1* | 12/2014 | Saitou | F02D 9/04 60/320 |
| 2014/0366516 | A1* | 12/2014 | Mitsuda | F01N 13/08 60/320 |
| 2016/0096426 | A1 | 4/2016 | Kurokawa | |

FOREIGN PATENT DOCUMENTS

| | | |
|---|---|---|
| JP | 1988-188214 U | 12/1988 |
| JP | 11-091371 A | 4/1999 |
| JP | 2001-227343 A | 8/2001 |
| JP | 2003-322489 A | 11/2003 |
| JP | 2007-001526 A | 1/2007 |
| JP | 2010-159027 A | 7/2010 |
| JP | 2010-173572 A | 8/2010 |
| JP | 2010-174855 A | 8/2010 |
| JP | 2012-051517 A | 3/2012 |
| JP | 2012-201159 A | 10/2012 |
| JP | 2012-255280 A | 12/2012 |
| JP | 2014-025402 A | 2/2014 |
| JP | 2015-000636 A | 1/2015 |
| JP | 2015-059500 A | 3/2015 |
| JP | 2015-117494 A | 6/2015 |
| KR | 10-2011-0104300 A | 9/2011 |
| WO | 2009/101935 A1 | 8/2009 |
| WO | 2012/035981 A1 | 3/2012 |
| WO | 2015/087929 A1 | 6/2015 |

OTHER PUBLICATIONS

Japanese Office Action dated Feb. 1, 2019 issued in corresponding JP Application 2015-152065.
Japanese Office Action dated Jan. 31, 2019 issued in corresponding JP Application 2015-152063.
European Search Report dated Dec. 5, 2018 issued in corresponding EP Application 16832500.9.

* cited by examiner

WORK VEHICLE

CROSS REFERENCES TO RELATED APPLICATIONS

This application is a national stage application pursuant to 35 U.S.C. § 371 of International Application No. PCT/JP2016/003491, filed on Jul. 28, 2016, which claims priority under 35 U.S.C. § 119 to Japanese Patent Application Nos. 2015-152059, 2015-152042, 2015-152065, and 2015-152063, all filed on Jul. 31, 2015, the disclosures of which are hereby incorporated by reference in their entireties.

TECHNICAL FIELD

The present invention relates to a work vehicle on which an engine including an exhaust gas purifier is mounted.

BACKGROUND ART

In a technique known to date, a temperature sensor and a pressure difference sensor are provided in order to detect a temperature and a pressure difference inside an exhaust gas purifier disposed in an engine. Patent Literature 1 (PTL) discloses an agricultural vehicle including an exhaust gas purifier provided with a temperature sensor and a pressure difference sensor.

The agricultural vehicle of PTL 1 has the following configuration. Specifically, the agricultural vehicle of PTL 1 includes an exhaust filter that is an exhaust gas purifier of a continuous regeneration type. The exhaust filter includes a purification casing including an inlet-side case and an outlet-side case. A sensor bracket projecting laterally from the purification casing is bolted to a thick-plate flange radially projecting from the outlet-side case of the purification casing. Wire connectors for a pressure difference sensor and a DPF temperature sensor are attached to a flat upper surface of the sensor bracket.

CITATION LIST

Patent Literature

PTL 1: Japanese Patent Application Laid-Open No. 2015-59500

SUMMARY OF INVENTION

Technical Problem

In the configuration described in PTL 1, however, dedicated members (sensor brackets) for attaching the pressure difference sensor and the DPF temperature sensor need to be bolted to an end of a DPF. Thus, the configuration is complicated so that assembly takes much expense in effort, and is disadvantageous in terms of costs.

Some aspects of the present invention have been made in view of the foregoing circumstances, and have an object of providing a work vehicle that can achieve a simplified configuration and reduced costs without using a dedicated member for supporting sensors of an exhaust gas purifier and wire connectors for the sensors.

Solution to Problem and Advantages

Problems to be solved by some aspects of the present invention have been described above, and solutions for the problems and advantages of the solutions will be described below.

In an aspect of the present invention, a work vehicle having the following configuration is provided. Specifically, the work vehicle includes an engine and a fan shroud. The engine includes an exhaust gas purifier that purifies exhaust gas. The fan shroud is disposed ahead of the engine. The exhaust gas purifier includes a filter that collects particulate matter in the exhaust gas. The engine includes a pressure difference sensor that detects a pressure difference between an upstream side and a downstream side of the filter of the exhaust gas purifier in a direction in which the exhaust gas flows. The pressure difference sensor is supported by the fan shroud.

In this manner, it is unnecessary to additionally provide a dedicated member for supporting the pressure difference sensor. Thus, the configuration of the work vehicle can be simplified so that costs can be reduced.

The work vehicle preferably has the following configuration. Specifically, the engine includes a pipe. The pipe connects the upstream and downstream sides of the filter of the exhaust gas purifier to the pressure difference sensor. A part of an upper portion of the fan shroud includes a bent portion that bends toward the exhaust gas purifier. The pressure difference sensor is supported by the bent portion.

In this manner, the pressure difference sensor can be supported with a simple configuration. In addition, since the pressure difference sensor is disposed at a position close to the exhaust gas purifies, the length of the pipe to the pressure difference sensor can be reduced.

The work vehicle preferably has the following configuration. Specifically, the engine an intake pipe, a temperature sensor, and a control section. The intake pipe guides air sucked from outside. The temperature sensor detects a temperature of the exhaust gas in the exhaust gas purifier. The control section receives a detection result of the temperature sensor. A wire connector is disposed in an intermediate portion of a wire from the temperature sensor to the control section. The wire connector is supported by the intake pipe.

In this manner, it is unnecessary to additionally provide a dedicated member for supporting the wire connector for the temperature sensor. Thus, the configuration of the work vehicle can be simplified.

The work vehicle preferably has the following configuration. That is, at least a part of the intake pipe is disposed near the exhaust gas purifier in a longitudinal direction of the exhaust gas purifier. The intake pipe includes a support part integrally formed to project toward the exhaust gas purifier. The wire connector is supported by the support part of the intake pipe.

By utilizing a part of the intake part disposed near the exhaust gas purifier, the wire connector of the temperature sensor can be supported with a more strategic configuration. Furthermore, since the intake pipe includes a support par, the wire connector of the temperature sensor can be more easily supported.

In the work vehicle described above, the support part preferably has a rib shape.

In this manner, the wire connector of the temperature sensor can be suitably supported with a simple configuration, and rigidity of the intake pipe can be enhanced.

The work vehicle preferably has the following configuration. Specifically, the work vehicle includes a hood. The exhaust gas purifier is attached to an upper portion of the engine. The hood includes an exhaust hole at a position where the exhaust hole at least partially overlaps with the exhaust gas purifier in a side view. The exhaust gas purifier is disposed at a position close to one side relative to a lateral center in the hood. The exhaust hole is formed in at least one of left and right side walls of the hood on which the exhaust gas purifier is disposed.

In this manner, heat dissipated from the exhaust gas purifier can be efficiently released from the exhaust hole to the outside of the hood. Consequently, problems due to high temperatures are less likely to occur in devices and components in an engine room.

In the work vehicle described above, preferably, the exhaust gas purifier has a cylindrical shape whose axial length is larger than a diameter of the exhaust gas purifier, and an axial direction of the exhaust gas purifier is parallel to a front-rear direction (longitudinal direction) of the work vehicle.

In this manner, as compared a case where the axial direction of the cylindrical shape of the exhaust gas purifier is oriented in the left-right direction (lateral direction), the projected area of the exhaust gas purifier on a side wall of the hood increases. Consequently, an area in which the exhaust gas purifier and the exhaust hole overlap with each other in a side view can be easily increased so that heat release efficiency of the engine room can be further increased.

The work vehicle preferably has the following configuration. Specifically, the fan shroud is disposed ahead of the exhaust gas purifier. An air cleaner is ahead of the fan shroud.

In this manner, arrangement in which an operator can easily access the air cleaner while the hood is open can be obtained, and thus, maintenance of the air cleaner can be easily performed. In addition to the easy release of heat from the exhaust gas purifier through the exhaust hole described above, the fan shroud is disposed between the exhaust gas purifier and the air cleaner, and thus, the air cleaner is susceptible to heat from the exhaust gas purifier.

The work vehicle preferably has the following configuration. Specifically, the air cleaner is fixed to a support bracket disposed ahead of the fan shroud. A sub-tank that stores cooling water for a radiator is fixed to the support bracket.

In this manner, no special support bracket for fixing the sub-tank is needed, and thus, the number of components can be reduced to reduce costs.

The work vehicle preferably has the following configuration. Specifically, the support bracket tilts to one of left and right toward a front in a plan view. The air cleaner tilts along an orientation of the support bracket in a plan view.

In this manner, even in a case where the lateral width of inner space of the hood decreases toward the front, the air cleaner can be appropriately disposed not to interfere with the inner wall of the hood with a simple configuration.

DESCRIPTION OF EMBODIMENTS

Figure 1:
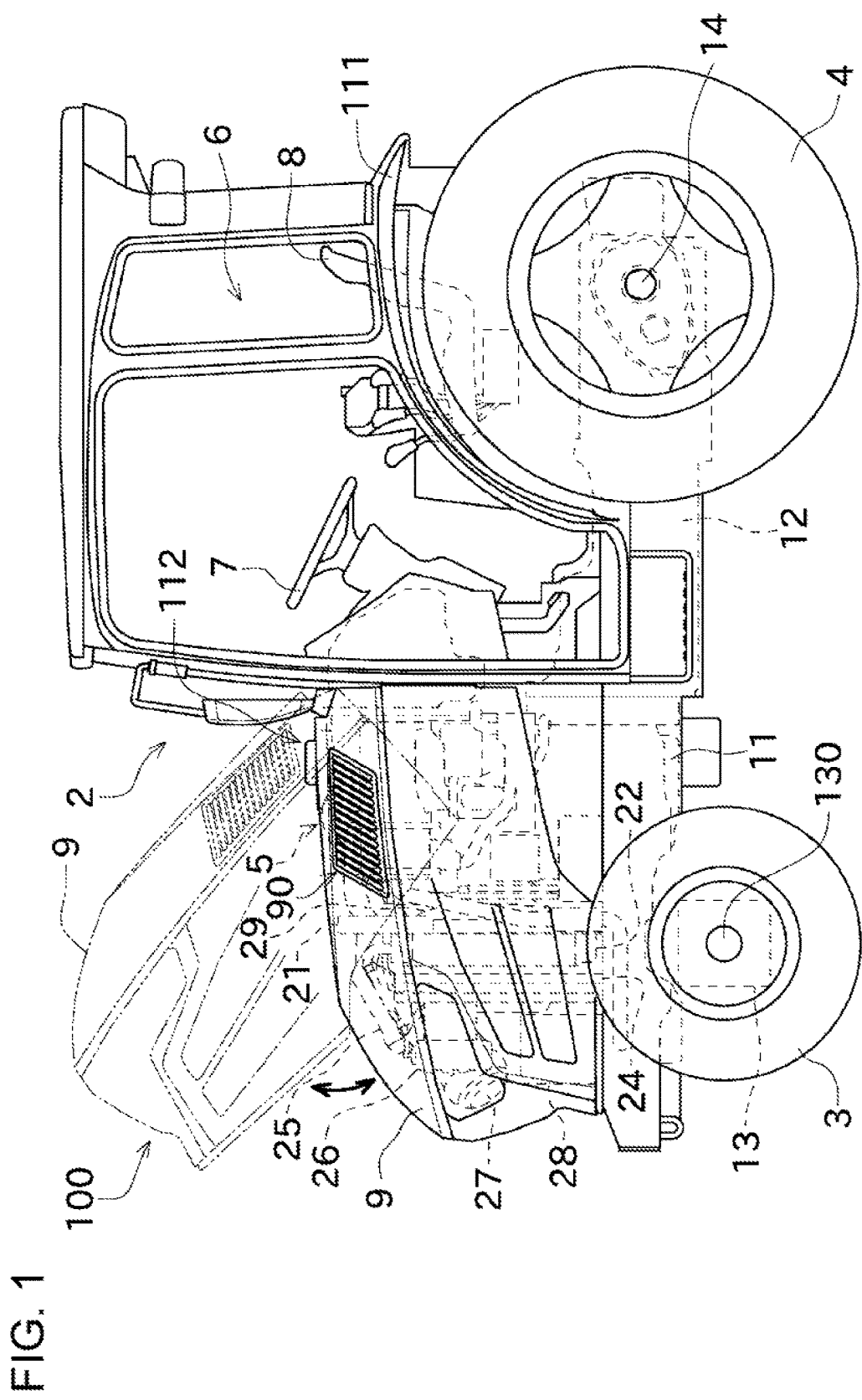
FIG. 1 A side view of a tractor according to an embodiment of the present invention.

With reference to the drawings, an embodiment of the present invention will now be described. First, with reference to FIG. 1, for example, an overall configuration of a tractor 100 according to an embodiment of the present invention and an internal configuration of a hood 9 will be described. FIG. 1 is a side view of the tractor 100 according to an embodiment of the present invention. In the following description, terms such as "left" and "right" refer to the left and the right, for example, in the direction in which the tractor 100 moves forward.

The tractor 100 serving as a work vehicle for farm work illustrated in FIG. 1 is equipped with various work devices such as a plow and a loader to enable various types of work.

As illustrated in FIG. 1, the tractor 100 includes a vehicle body 2, a pair of left and right front wheels 3, and a pair of left and right rear wheels 4. The front wheels 3 support a front portion of the vehicle body 2, and the rear wheels 4 support a rear portion of the vehicle body 2.

A hood 9 is disposed on the front portion of the vehicle body 2 of the tractor 100 and is configured to be opened and closed so as to expose the inside. The hood 9 has a streamline shape, and a front portion of the hood 9 gradually becomes narrow in both of the top-bottom direction (vertical direction) and the left-right direction (lateral direction) toward the front. This shape can achieve reduction of air resistance during travelling and enhancement of aesthetic design.

Figure 2:
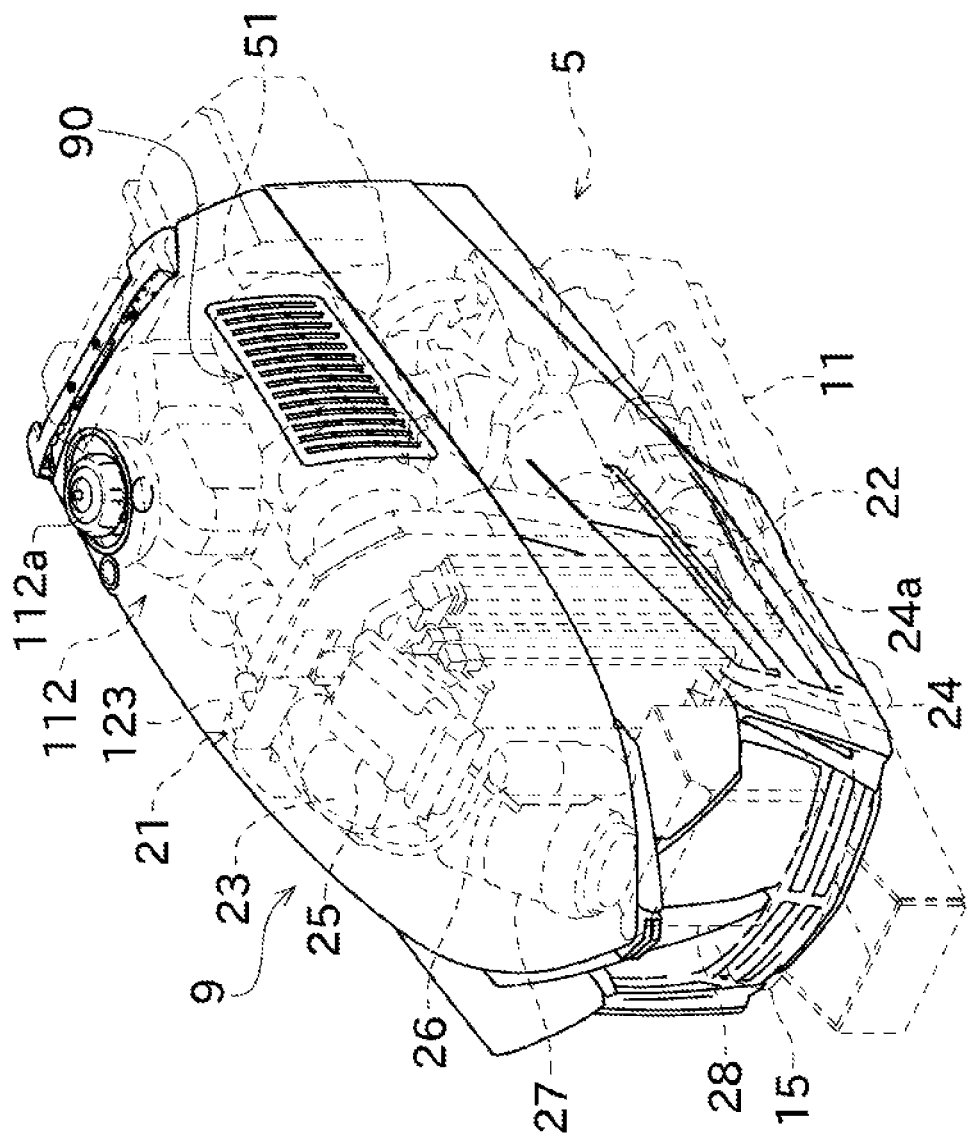
FIG. 2 A perspective view illustrating a positional relationship between a hood and an internal configuration of the hood.
Figure 5:
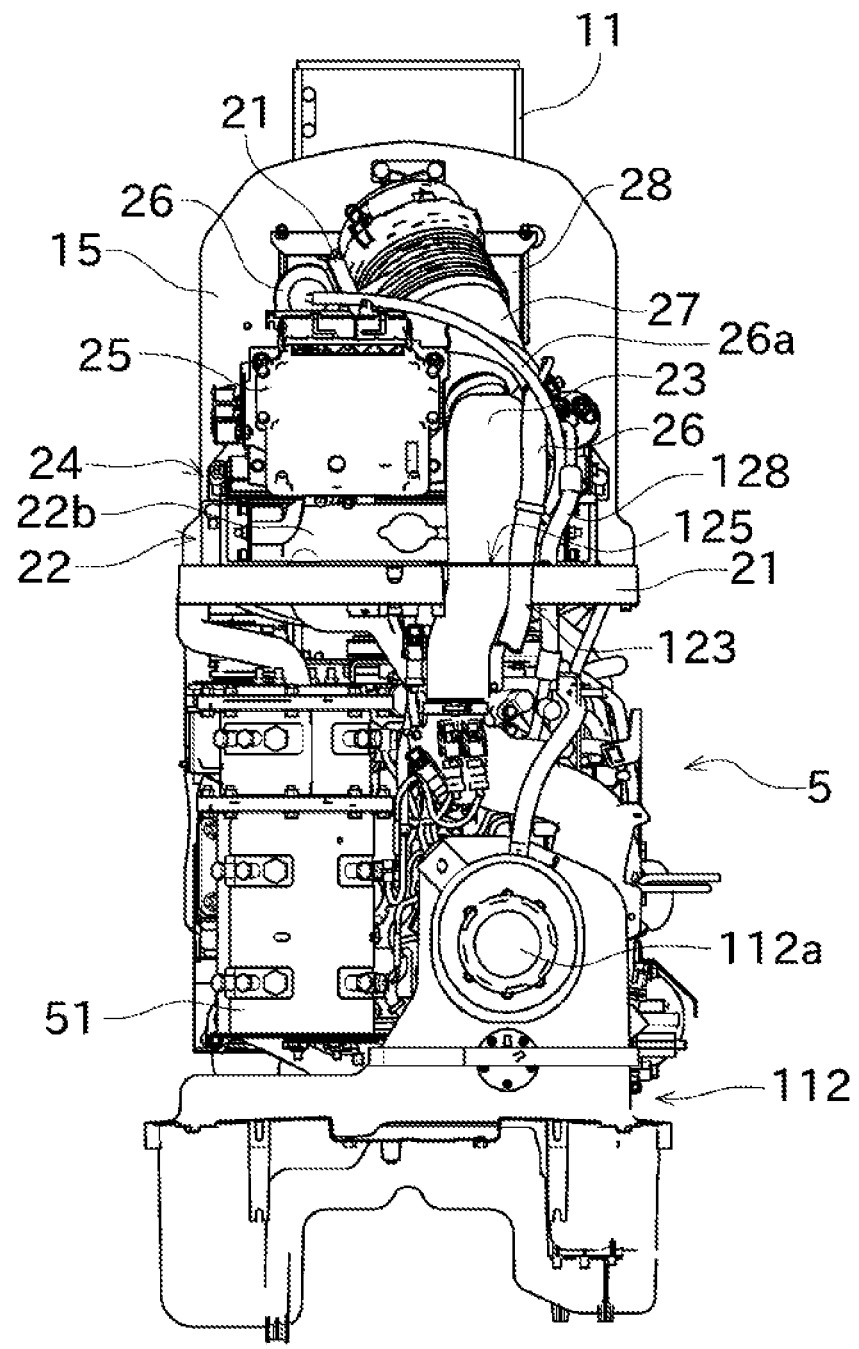
FIG. 5 A plan view illustrating the internal configuration of the hood.

As illustrated in FIGS. 1 and 5, the hood 9 houses a part of a fuel tank 112 and an engine 5. The engine 5 is supported by an engine frame 11 of the tractor 100 directly or with a vibration isolator or another member interposed therebetween. A fan shroud (partition plate) 21 is disposed immediately ahead of the engine 5. The fan shroud 21 is disposed to separate the engine 5 disposed in a rear portion of the hood 9 from devices and components disposed in a front portion of the hood 9. A radiator 22, a condenser 24, an engine control unit (ECU) 25, a sub-tank 26, an air cleaner 27, and a battery 28 are disposed further ahead of the fan shroud 21 (corresponding to a front portion of an inner space of the hood 9). As illustrated in FIG. 2, the fan shroud 21, the radiator 22, the condenser 24, the ECU 25, the sub-tank 26, the air cleaner 27, and the battery 28 are arranged in this order from the rear to the front on the upper side (upper surface) of an attachment plate 15 fixed to the engine frame 11, and are all housed in the hood 9.

The fuel tank 112 is disposed above the engine 5 and adjacent to a diesel particulate filter (DPF) 51. The fuel tank 112 has a filler opening 112a in an upper portion thereof, and refueling is performed through the filler opening. As illustrated in FIGS. 1 and 2, the filler opening 112a is disposed to project from an opening formed in an upper portion of the hood 9 so that an operator can perform refueling independently of whether the hood 9 is open or closed.

The engine 5 is configured as a common rail diesel engine including a plurality of cylinders. Specifically, the engine 5 includes an unillustrated common rail that stores fuel supplied from the fuel tank 112 under high pressure. The fuel supplied from the common rail is ejected by an unillustrated injector disposed for each cylinder into a combustion chamber in the cylinder.

The DPF 51 is disposed in an upper left portion of the engine 5. The DPF 51 is connected to an exhaust pipe of the engine 5 and is configured to collect and remove particulate matter (PM) emitted from the engine 5 with a filter. The amount of PM collected by the DPF 51 increases with an operation of the engine 5. Thus, when a predetermined amount of PM collected by the DPF 51 is accumulated, the exhaust temperature of the engine 5 is controlled to increase so that the PM is burnt at high temperatures in the DPF 51, and thereby, clogging of the filter is prevented (DPF regeneration).

In performing the DPF regeneration, for example, the DPF 51 can generate a large amount of heat in some cases, and might cause heat damage on equipment disposed around the DPF 51. To prevent this, as illustrated in FIG. 2, exhaust holes 90 are formed to be located near the DPF 51 while the hood 9 is closed. This configuration can enhance efficiency of heat release from the inside of an engine room to the outside of the hood 9 to prevent problems due to high temperature from occurring in devices and components in the engine room.

Figure 3:
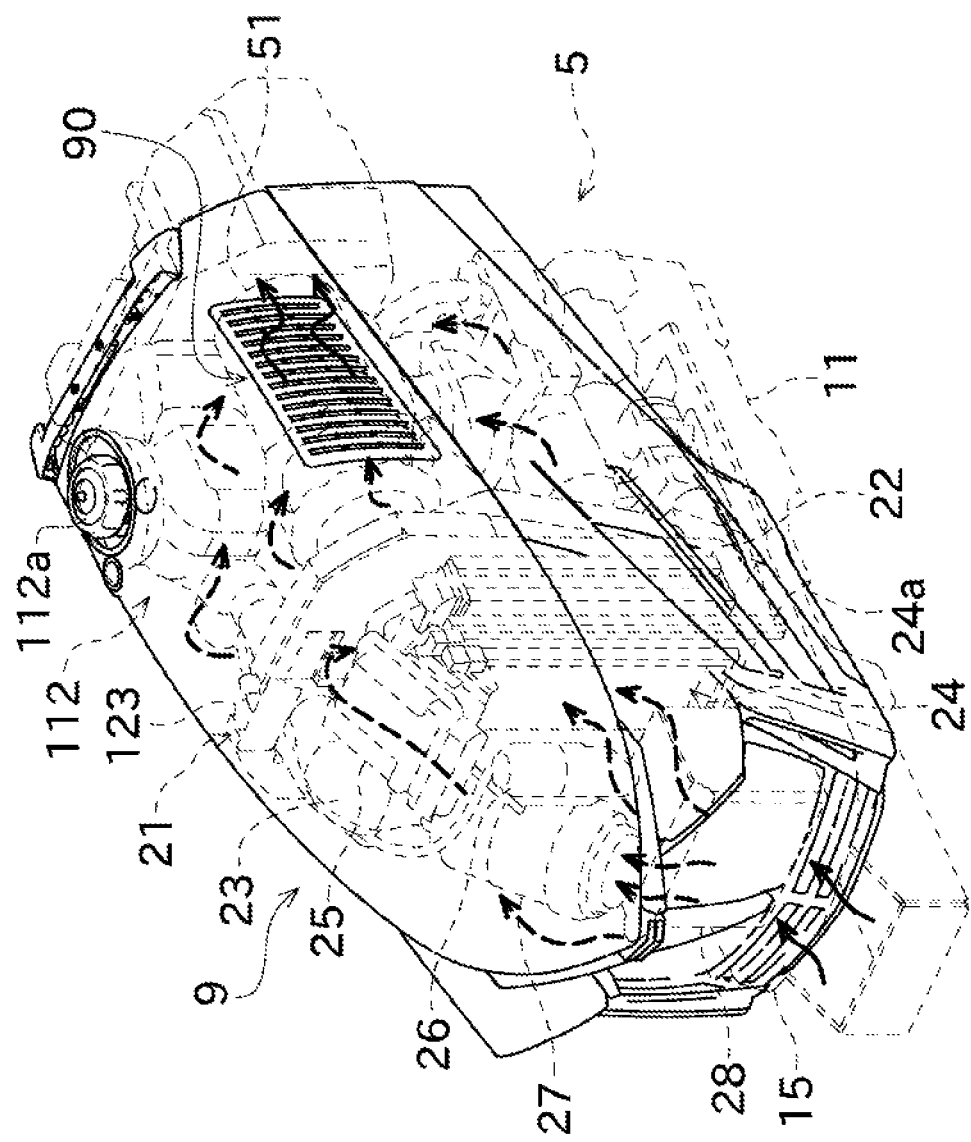
FIG. 3 A perspective view schematically illustrating an air flow inside the hood.

An air flow in the hood 9 will now be described with reference to FIG. 3. FIG. 3 is a perspective view schematically illustrating an air flow inside the hood 9.

Air at a relatively low temperature that has flowed from an unillustrated front grille in the front surface of the hood 9 is partially taken in the air cleaner 27, and flows to the engine 5 by way of an intake pipe 23. A part of air not taken in the air cleaner 27 flows along the upper and lower surfaces of the ECU 25 disposed to extend forward and downward from space above the condenser 24, and efficiently cools the ECU 25. The ECU 25 is disposed to rise rearward, and the inner wall of a portion of the hood 9 covering space above the ECU 25 is also disposed to rise rearward. Thus, the air smoothly flows around the ECU 25.

With an air-guide effect of the fan shroud 21 described above, most part of air that has been taken through the front grille and has not been sucked in the air cleaner 27 (including the air that has flowed around the ECU 25 as described above) passes through the condenser 24 and the radiator 22 disposed to cover the front surface of an air inlet (not shown) formed at the center of the fan shroud 21. In this manner, refrigerant of an air conditioner and cooling water of the engine can be cooled by heat exchange.

Air that has passed through the radiator 22 is sent rearward by a cooling fan 29 (see FIG. 1) disposed in the air inlet of the fan shroud 21. Thereafter, the air strikes the front surface of the engine 5 to expand radially, and then flows rearward in spaces above and at the left and right of the engine 5. Accordingly, the engine 5 can be efficiently cooled. Air flowing along the left side surface of the engine 5 smoothly flows along the longitudinal direction of the DPF 51, and as a result, the DPF 51, which tends to be at high temperatures, can be efficiently cooled. Air that has flowed rearward of the fan shroud 21 takes heat from the engine 5 and the DPF 51 to thereby become relatively high-temperature air, and most part of the air is exhausted out of the hood 9 from the exhaust holes 90 formed at a position of the hood 9 substantially facing the DPF 51 in the lateral direction. Accordingly, air that is at a high temperature because of passage near the DPF 51 can be easily immediately exhausted from the exhaust holes 90 so that it is possible to prevent the high-temperature air from remaining in the hood 9 for a long time to reduce the cooling effect.

Figure 6:
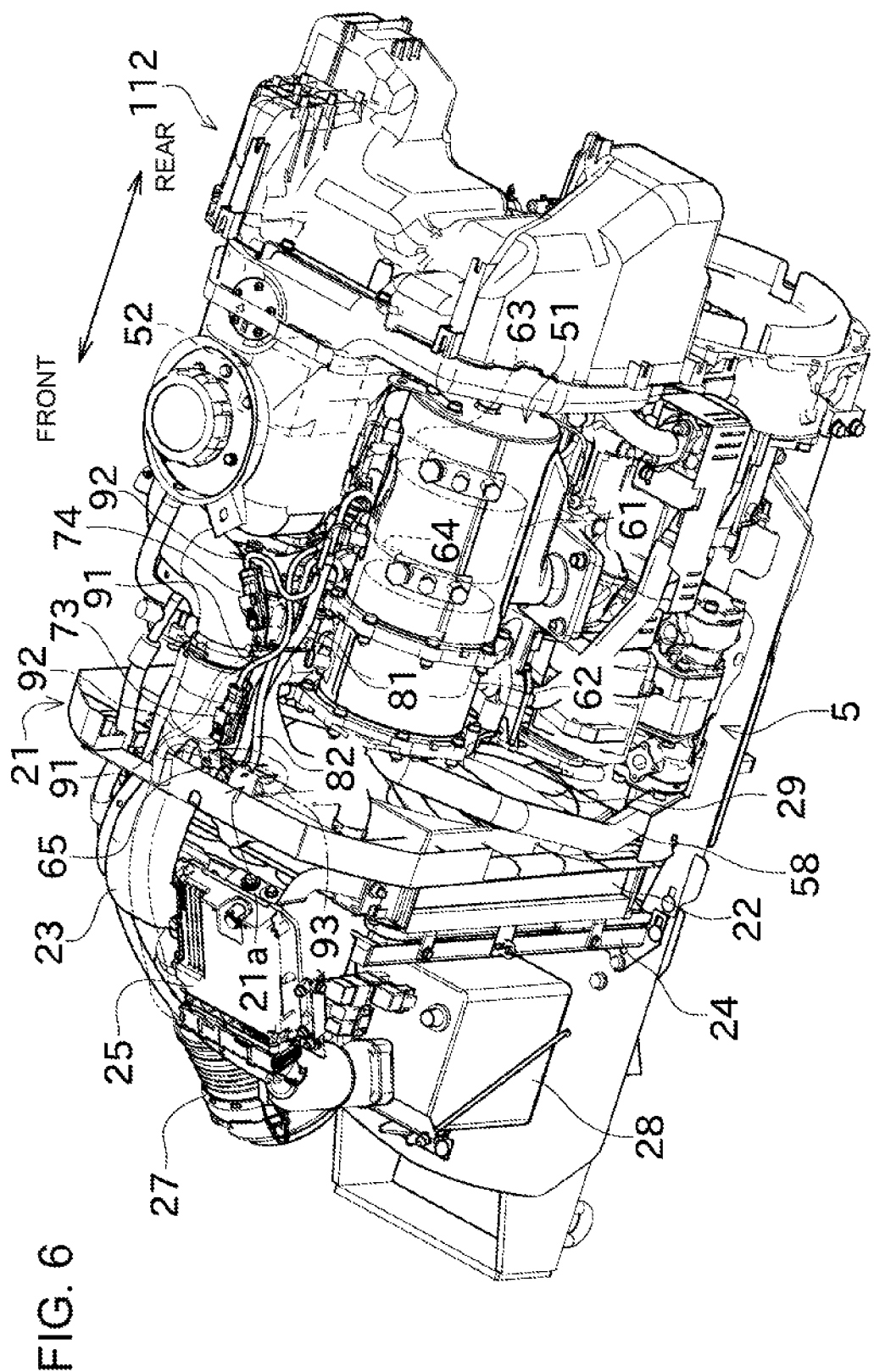
FIG. 6 A perspective view illustrating the internal configuration of the hood.

The fan shroud 21 is configured to surround the periphery of the cooling fan 29 that is driven by the engine 5, and is disposed ahead of the engine 5. The fan shroud 21 has substantially a flat plate shape, and has its thickness direction oriented in the longitudinal direction. A notch 123 through which members of the engine 5 such as the intake pipe 23 pass is formed in an upper right portion of the fan shroud 21. The fan shroud 21 is disposed to cover a wide range of the front surface of the engine body as illustrated in FIG. 6, and partitions the inner space of the hood 9 into front and rear spaces. Accordingly, devices disposed ahead of the fan shroud 21 (e.g., the radiator 22 and the condenser 24) can be shielded against heat from the engine 5.

The fan shroud 21 is made of a synthetic resin and is formed into a shape having the notch 123 through which the intake pipe 23 and engine harness 126 pass. A closing sheet 125 that can be easily detached is attached to the upper end of the front surface of the fan shroud 21 so as to cover an opening of the notch 123 of the fan shroud 21. In this manner, even upon application of a vibration or an impact to the tractor 100, the intake pipe 23 and other members passing through the notch 123 can be retained within a predetermined range so as not to come out of the notch 123. This configuration can ease maintenance of members such as the intake pipe 23 while keeping high levels of the air-guide effect of the cooling fan that efficiently takes outdoor air for cooling the engine 5 and a shielding effect of inhibiting heat transfer from the engine 5 toward devices ahead.

The engine harness 126 electrically connects components of the engine 5 to the ECU 25. The engine harness 126 is supported by ribs (to be described in detail later) formed along the longitudinal direction of the intake pipe 23. In this manner, the number of components can be reduced as compared to a configuration in which an additional stay or the like for supporting the engine harness 126 is provided, and the engine harness 126 can be disposed along the intake pipe 23 so that the engine harness 126 can be disposed in a small space.

The cooling fan 29 in the fan shroud 21 is driven by receiving a driving force from the engine 5. Rotation of the cooling fan 29 sends air taken from the front grille toward the engine 5 through the radiator 22 and the cooling fan 29 to thereby cool the engine 5.

The radiator 22 is a device that cools cooling water in a water jacket in the engine 5, and is attached to the front surface of the fan shroud 21. An unillustrated circulation path in which cooling water circulates is formed between the radiator 22 and an unillustrated water jacket formed in the engine 5. Cooling water in the water jacket whose temperature has become high because of heat generation by the engine 5 is sent to the radiator 22. The cooling water is cooled by outdoor air taken from the front grille while passing through the radiator 22, and then returns to the water jacket again to cool the engine 5.

Specifically, the radiator 22 includes a cooling core (heat exchanger) 22a, an upper tank 22b, and a lower tank 22c. The cooling core 22a is configured to have substantially a rectangular flat plate shape with a predetermined thickness and has its thickness direction oriented in the longitudinal direction. The cooling core 22a is configured to allow air to pass therethrough in the thickness direction (longitudinal direction) thereof. The upper tank 22b and the lower tank 22c are disposed to sandwich the cooling core 22a in the vertical direction.

An unillustrated tube and an unillustrated fin, for example, are disposed inside the cooling core 22a. The upper tank 22b and the lower tank 22c are connected to the tube of the cooling core 22a and each connected to the water jacket of the engine 5 through a pipe or the like. The tube is a conduit through which cooling water can pass, dissipates heat from the cooling water, and transfers the heat to the fin. The fin dissipates heat from the tube into the air. As described above, since the cooling fan 29 is disposed behind the radiator 22, cooling water taken by the cooling fan 29 strikes the tube and the fin to thereby efficiently cool cooling water flowing in the tube.

In this configuration, cooling water sent by an unillustrated cooling water pump from the engine 5 is stored in the upper tank 22b disposed in an upper portion of the radiator 22. Cooling water stored in the upper tank 22b is sent to the lower tank 22c disposed in a lower portion of the radiator 22 through the tube disposed in the cooling core 22a. While the cooling water passes through the tube, heat dissipation through the tube and the fin is performed. The cooling water at a reduced temperature is caused to return to the water jacket of the engine 5 by way of the lower tank 22c.

The condenser 24 is configured as a heat exchanger, and includes a tube through which high-pressure liquid refrigerant for use in an air conditioner for performing air conditioning in a cabin 6 passes and a corrugated or plate-type fin configured around the tube. The condenser 24 is supported by a condenser frame 24a and is attached to the front of the radiator 22.

The ECU 25 is configured as a small-size computer, and the engine 5 and the ECU 25 constitute an engine device. Based on information from various sensors attached to the engine 5, the ECU 25 outputs control instructions for controlling the amount of fuel injection, the timing of fuel injection, and so forth, to various actuators (including the injector included in the engine 5) to thereby control an operation of the engine 5.

As illustrated in FIGS. 1 and 2, the ECU 25 is disposed obliquely above the devices such as the condenser 24 in the hood 9 and is oriented along the tilt shape of the upper front portion of the hood 9. Thus, in the case of accessing to the ECU 25 while the hood 9 is open, other components are less likely to hinder the access. Thus, maintenance of the ECU 25 can be easily performed.

The ECU 25 is supported with interposition of a vibration-isolating support structure 135 constituted by a plurality of vibration-isolating rubber members 133. Specifically, a support plate 132 is attached to an upper portion of the arch-shaped condenser frame 24a supporting the condenser 24, and the vibration-isolating support structure 135 is disposed on the support plate 132. A part of the plurality of vibration-isolating rubber members 133 is oriented perpendicularly to the thickness direction of the ECU 25, and the other vibration-isolating rubber members 133 are oriented in parallel with the thickness direction of the ECU 25. The ECU 25 is fixed to the support plate 132 through the vibration-isolating rubber members 133. The configuration described above is intended to prevent vibrations and impacts applied to the ECU 25 and ease maintenance of the ECU 25.

The sub-tank 26 is used for storing an overflowed part of cooling water in the radiator 22. Specifically, as illustrated in FIG. 5, the sub-tank 26 is connected to the upper tank 22b through a flexible hose (pipe member) 26a. In this configuration, when the amount of cooling water in the radiator 22 increases because of thermal expansion or other reasons, the cooling water in the radiator 22 flows into the sub-tank 26 through the hose 26a. On the other hand, when the amount of cooling water in the radiator 22 decreases, cooling water in the sub-tank 26 is caused to return to the radiator 22. In this manner, cooling water in the radiator 22 can be maintained in a predetermined amount.

The air cleaner 27 is configured to house an air cleaner element for removing foreign matter in the air. The air cleaner 27 is connected to the engine 5 through the intake pipe 23, and constitutes a part of an intake structure of the engine 5. The intake pipe 23 extending from the engine 5 passes through the notch 123 formed in the fan shroud 21 in the front-rear direction (longitudinal direction), and passes above the radiator 22 and then bends downward to be connected to the air cleaner 27.

The air cleaner 27 and the sub-tank 26 are respectively fixed to the left and right sides of a support bracket 121 having a flat-plate shape and having its thickness direction thereof oriented in the horizontal direction. In this manner, no special fixing members for fixing the air cleaner 27 and the sub-tank 26 are necessary so that the number of components can be reduced, and thereby, costs can be reduced.

The battery 28 supplies electric power to various electric components included in the tractor 100 (e.g., a cell motor included in the engine 5, headlights of the tractor 100, and the ECU 25).

As illustrated in FIG. 1, the cabin 6 an operator is to get aboard is disposed in a rear portion of the vehicle body 2. A steering wheel 7 to be operated by the operator, a driver seat 8 on which the operator is seated, and various operation devices (not shown) for performing various operations are provided inside the cabin 6.

The vehicle body frame constituting a frame of the vehicle body 2 includes an engine frame 11 and a transmission case 12 fixed to a rear portion of the engine frame 11. A front axle case 13 is attached to the bottom of the engine frame 11. The front wheels 3 are attached to the front axle case 13 with a front axle 130 interposed therebetween. The rear wheels 4 are attached to the transmission case 12 with a rear axle 14 interposed therebetween. Spaces above the left and right rear wheels 4 are covered with left and right rear fenders 111.

The transmission case 12 decelerates a driving force from the engine 5 and transmits the force to the front axle case 13 and the rear axle 14. When the operator operates a shift lever of an unillustrated transmission device, the gear-shift ratio in the transmission case 12 is thereby changed so that the traveling speed of the tractor 100 can be adjusted.

The driving force of the engine 5 is transmitted to a PTO shaft (not shown) projecting from the rear end of the transmission case 12. The tractor 100 is configured to be equipped with the work devices described above at the rear end of the tractor 100. The PTO shaft can drive the work devices with an unillustrated universal joint, for example.

The thus-configured tractor 100 can perform various types of work such as tillage, seeding, and harvesting, while traveling on a field.

Figure 7:
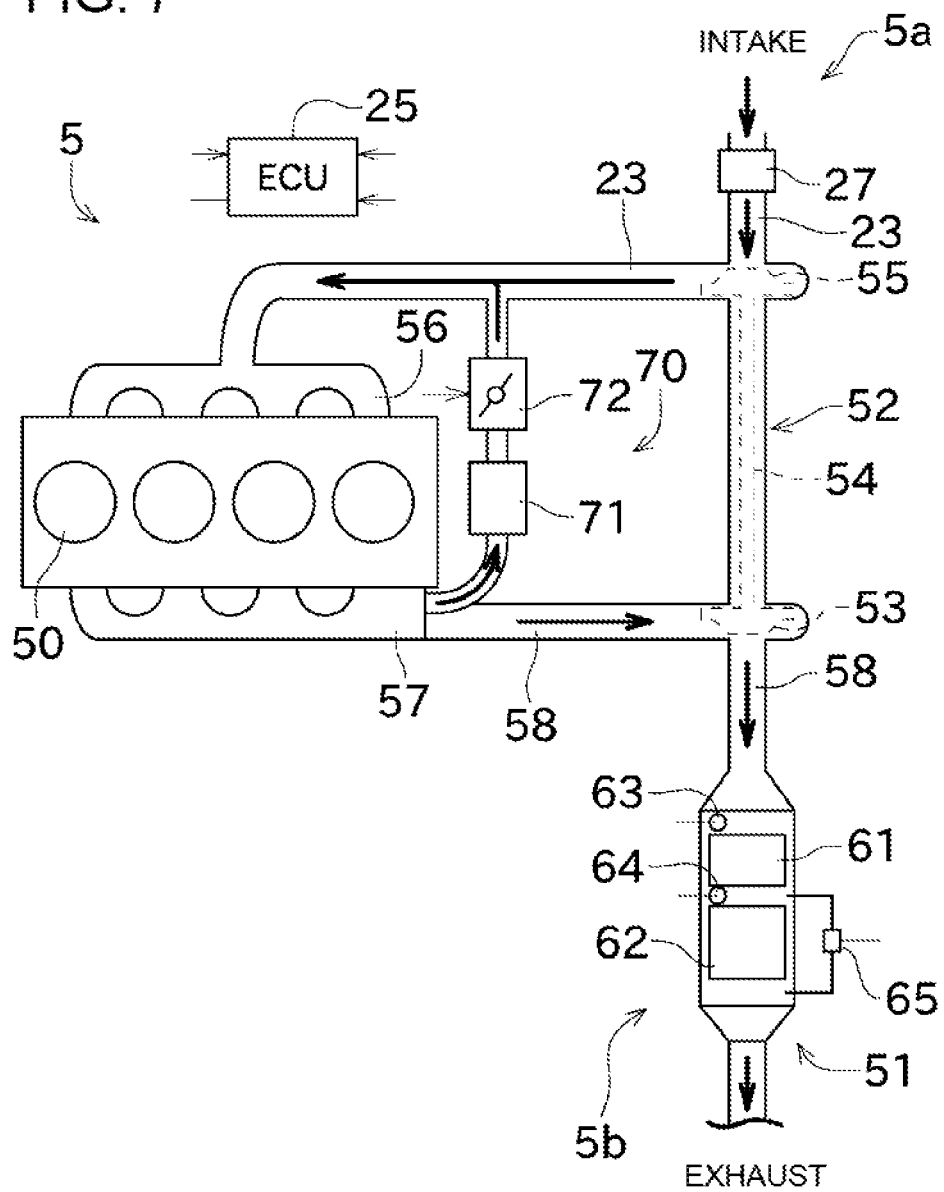
FIG. 7 An explanatory drawing schematically illustrating flows of intake air and exhaust air of an engine.

A configuration of the engine 5 will now be briefly described with reference to FIG. 7. FIG. 7 is an explanatory drawing schematically illustrating flows of intake air and exhaust air of the engine 5.

As illustrated in FIG. 7, the engine 5 includes, as main components, an intake part 5a for sucking air from outside, an unillustrated cylinder including a combustion chamber 50, and an exhaust part 5b for ejecting exhaust gas generated in the combustion chamber 50 because of fuel combustion to the outside.

As illustrated in FIG. 7, the intake part 5a includes the intake pipe 23 that is a conduit for intake air. The intake part 5a includes the air cleaner 27, a turbocharger 52, and an intake manifold 56 that are arranged in this order from an upstream side in a direction in which intake air flows in the intake pipe 23.

As illustrated in FIG. 7, the turbocharger 52 includes a turbine 53, a shaft 54, and a compressor 55. An end of the shaft 54 is connected to the turbine 53, and the other end of the shaft 54 is connected to the compressor 55. The turbine 53 is configured to rotate by using exhaust gas. The compressor 55 coupled to the turbine 53 through the shaft 54 rotates with rotation of the turbine 53. Rotation of the compressor 55 can compress air purified by the air cleaner 27 and forcibly suck the air therein.

The intake manifold 56 is configured to distribute air supplied from the intake pipe 23 in accordance with the number of cylinders of the engine 5, and supply the distributed air to the combustion chamber 50 of each cylinder.

An unillustrated intercooler for cooling compressed air sucked by the turbocharger 52 through heat exchange with cooling water or flowing air (i.e., wind) or an unillustrated intake valve for adjusting the amount of air to be supplied to the intake manifold 56 by adjusting the opening degree of the intake manifold 56 may be disposed downstream of the compressor 55 of the turbocharger 52.

Exhaust gas generated by fuel combustion in the combustion chamber 50 is exhausted to the outside of the engine 5 from the combustion chamber 50 through the exhaust part 5b.

As illustrated in FIG. 7, the exhaust part 5b includes an exhaust pipe 58 that is a conduit for exhaust gas. The exhaust part 5b includes an exhaust manifold 57 and the DPF 51 serving as an exhaust gas purifier. The exhaust manifold 57 and the DPF 51 are arranged in this order from an upstream side in a direction in which exhaust gas flows in the exhaust pipe 58.

The engine 5 includes an EGR device 70, and can reflux a part of exhaust gas to an intake side through the EGR device 70, as illustrated in FIG. 7. The EGR device 70 includes an EGR cooler 71 for cooling exhaust gas to be refluxed to intake air and an EGR valve 72 that can adjust the reflux amount of the exhaust gas. This configuration can reduce a maximum combustion temperature in a heavy-load operation of the engine 5 to thereby enable reduction of the amount of generation of nitrogen oxide (NOx).

The exhaust manifold 57 collects exhaust gas generated in the combustion chambers 50 and guides the exhaust gas to the exhaust pipe 58 so that the exhaust gas is supplied to the turbine 53 of the turbocharger 52.

An unillustrated exhaust valve that can adjust the exhaust amount of exhaust gas may be provided between the turbine 53 and the DPF 51 in the turbocharger 52.

As illustrated in FIG. 6, the DPF 51 is formed in a slender cylindrical shape, and has its longitudinal direction oriented in the longitudinal direction of the tractor 100. An outlet of the exhaust gas is disposed at one longitudinal end (front end) of the DPF 51.

Inside the DPF 51, an oxidation catalyst 61 and a soot filter 62 are disposed in this order from an upstream side in a direction in which exhaust gas flows. The oxidation catalyst 61 is composed of platinum, for example, and can promote oxidation of carbon monoxide, nitrogen monoxide, and other substances included in the exhaust gas. The soot filter 62 collects particulate matter (PM) of soot, for example, in the exhaust gas to thereby filter the exhaust gas, and oxidation reaction of PM is performed in the soot filter 62 so that the collected PM is removed. Exhaust gas introduced into the DPF 51 from the exhaust pipe 58 is purified by the soot filter 62, and then is exhausted to the outside of the engine 5.

The DPF 51 is provided with an oxidation catalyst temperature sensor 63 and a filter temperature sensor 64. The oxidation catalyst temperature sensor 63 detects a temperature near the inlet of the DPF 51 (exhaust gas upstream side of the oxidation catalyst 61). The filter temperature sensor 64 detects a temperature between the oxidation catalyst 61 and the soot filter 62 (exhaust gas upstream side of the soot filter 62).

As illustrated in FIG. 6, the oxidation catalyst temperature sensor 63 and the filter temperature sensor 64 are electrically connected to the ECU 25 through wires 91 and 92, respectively. A first wire connector 73 and a second wire connector 74 are disposed in intermediate portions of the wires 91 and 92 (where in FIG. 6, parts of the wires 91 and 92 near the ECU 25 are illustrated in a transparent manner by chain lines in order to ease illustration of the configuration of the pressure difference sensor 65 and its periphery). The first wire connector 73 and the second wire connector 74 are constituted by connection terminals that can be detachably attached to each other, and thus, maintenance can be easily performed.

Each of the oxidation catalyst temperature sensor 63 and the filter temperature sensor 64 detects an exhaust gas temperature in the DPF 51, and outputs a detection result to the ECU 25. Based on the temperatures detected by the oxidation catalyst temperature sensor 63 and the filter temperature sensor 64, the ECU 25 controls an operation of the engine 5 so that exhaust gas can be appropriately purified.

The pressure difference sensor 65 is disposed outside the DPF 51 and can detect a pressure difference between an upstream side and a downstream side of the soot filter 62. As illustrated in FIG. 6, the pressure difference sensor 65 is connected to the upstream side of the soot filter 62 through an upstream pipe 81. On the other hand, the pressure difference sensor 65 is connected to the downstream side of the soot filter 62 through a downstream pipe 82. In this manner, the pressure difference sensor 65 detects a pressure difference between a pressure of exhaust gas at an inflow side (upstream side) of the soot filter 62 and a pressure of exhaust gas at an outflow side (downstream side) of the soot filter 62.

As illustrated in FIG. 6, the pressure difference sensor 65 is electrically connected to the ECU 25 through the wire 93 (where in FIG. 6, the wire 93 is illustrated in a transparent manner by chain lines in order to ease illustration of the configuration of the pressure difference sensor 65 and its periphery). The pressure difference sensor 65 detects a pressure difference between the upstream side and the downstream side of the soot filter 62, and outputs a detection result to the ECU 25. Based on the pressure difference between the upstream side and the downstream side of the soot filter 62 detected by the pressure difference sensor 65, the ECU 25 can calculate the amount of PM accumulated on the soot filter 62, for example.

Figure 8:
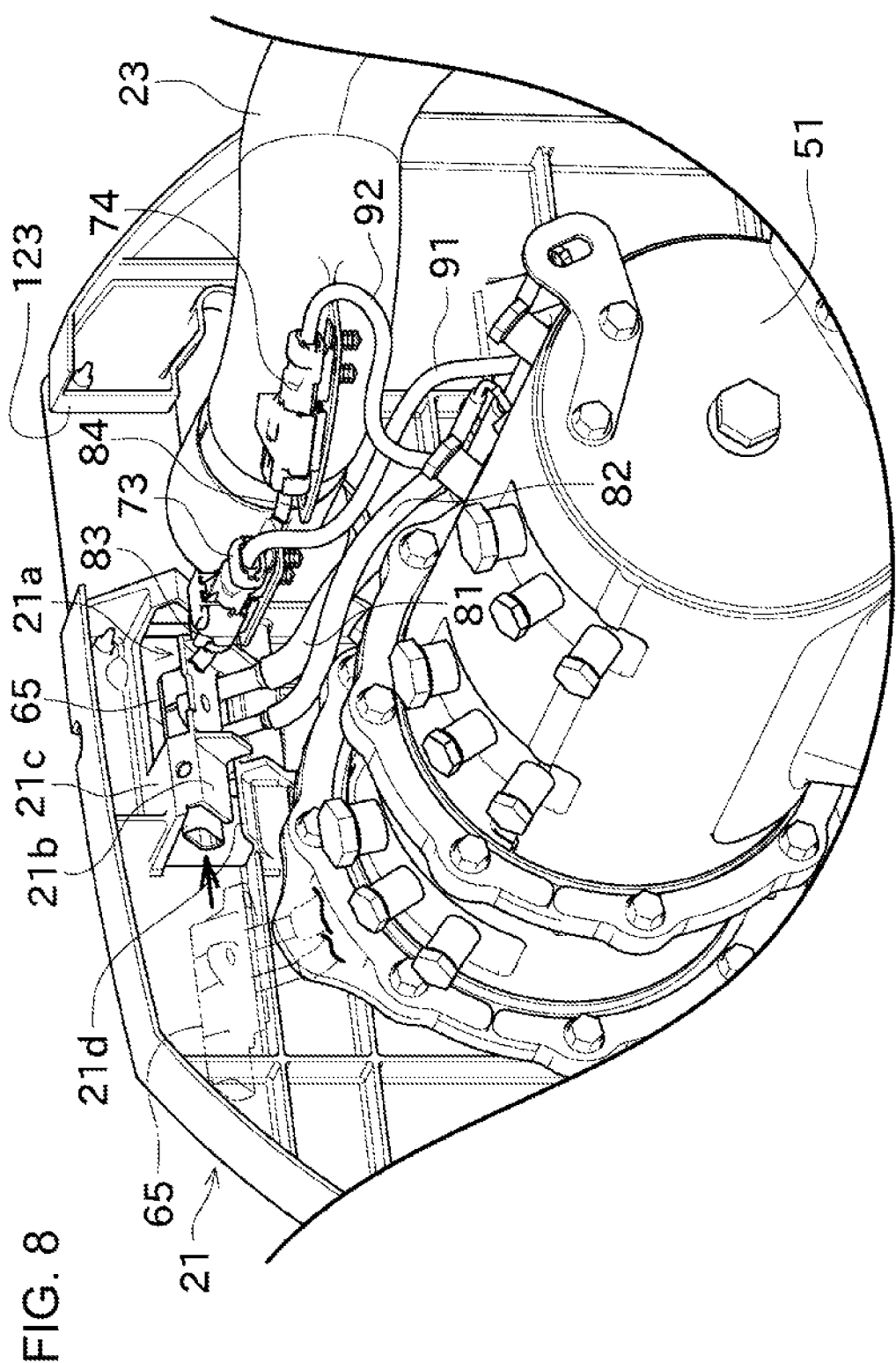
FIG. 8 An enlarged perspective view of a support structure for a pressure difference sensor when viewed from the rear.
Figure 9:
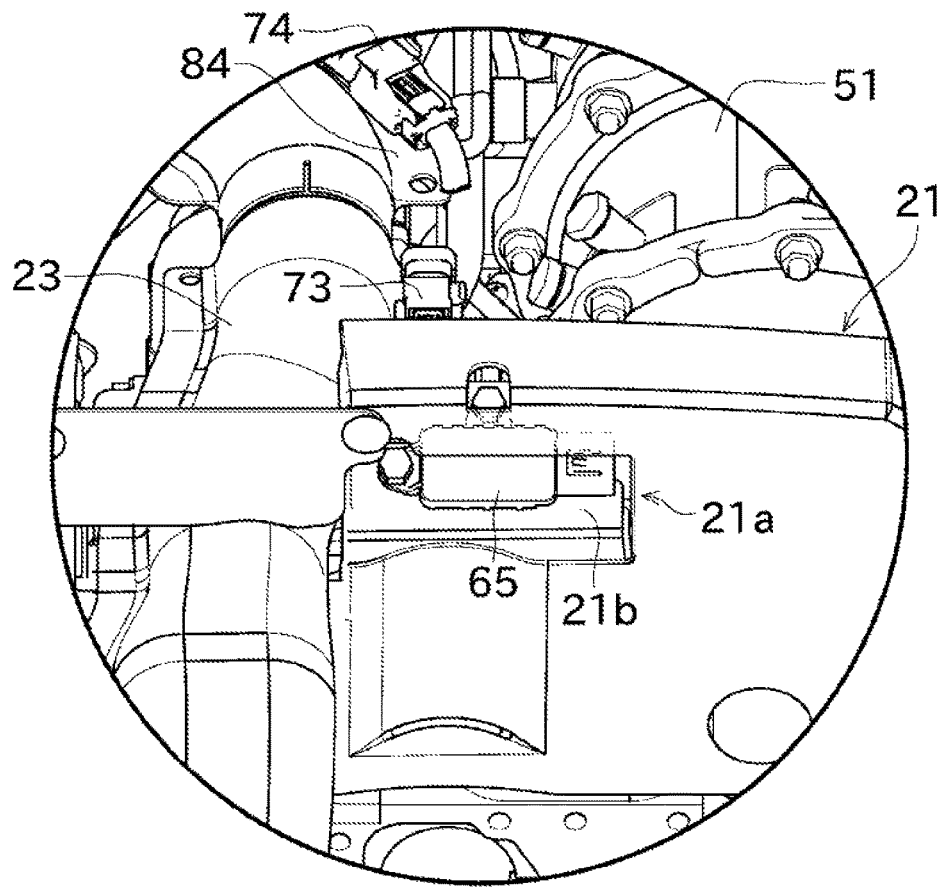
FIG. 9 An enlarged perspective view of the support structure for the pressure difference sensor when viewed from the front.

With reference now to FIGS. 8 and 9, a support structure for the pressure difference sensor 65 of the tractor 100 according to this embodiment will be described. FIG. 8 is an enlarged perspective view of the support structure for the pressure difference sensor 65 when viewed from the rear. FIG. 9 is an enlarged perspective view of the support structure for the pressure difference sensor 65 when viewed from the front.

As illustrated in FIG. 8, the pressure difference sensor 65 includes a slender rectangular parallelepiped sensor housing. Two cylindrical pipe connection parts disposed side by side project from the sensor housing, and the upstream pipe 81 and the downstream pipe 82 are respectively connected to these pipe connection parts.

In this embodiment, as illustrated in FIG. 8, the pressure difference sensor 65 is supported by the fan shroud 21 disposed to surround the outer periphery of the cooling fan 29 of the engine 5. Specifically, as illustrated in FIG. 8, the fan shroud 21 includes a bent portion 21a that is a substantially lateral center portion of an upper portion thereof and is partially bent toward the DPF 51. The pressure difference sensor 65 is fixed to the bent portion 21a.

As illustrated in FIG. 8, the bent portion 21a is constituted by a lower tilt portion 21b and an upper horizontal portion 21c.

The tilt portion 21b has a shape in which a part of the substantially plate-shaped fan shroud 21 whose thickness direction is oriented in the longitudinal direction is obliquely bent toward the DPF 51. The tilt portion 21b has a shape that tilts upward toward the DPF 51.

The horizontal portion 21c has a shape in which a part of the fan shroud 21 is bent perpendicularly toward the DPF 51. The rear end of the horizontal portion 21c is integrally connected to the upper end of the tilt portion 21b.

With the bent portion 21a having the structure described above, a small recess is formed in the fan shroud 21 to be open forward, and is used as a space in which the pressure difference sensor 65 is placed. As illustrated in FIG. 9, the pressure difference sensor 65 is fixed to the tilt portion 21b with an appropriate fixing member (e.g., a bolt).

In this embodiment, since the tilt portion 21b and the horizontal portion 21c are integrally connected to each other as described above, the bent portion 21a has a high rigidity. Thus, even when the pressure difference sensor 65 is attached to the tilt portion 21b, no excessive vibrations, for example, occur, and durability of the fan shroud 21 can be enhanced. In addition, since the fan shroud 21 is integrally molded using a resin, even the bent portion 21a having a complicated shape as described above can be easily formed.

As illustrated in FIG. 8, a lateral end (specifically, left) of the bent portion 21a is open to be continuous to a space behind the fan shroud 21. The tilt portion 21b has a slit portion 21d that is slender in the lateral direction and penetrates the tilt portion 21b. The slit portion 21d is open at a side at which the bent portion 21a is open similarly, and is configured to enable the pressure difference sensor 65 to be fixed to the bent portion 21a with the pipe connection part of the pressure difference sensor 65 passing through the slit portion 21d.

With this configuration, to have the pressure difference sensor 65 supported by the fan shroud 21, the two pipe connection parts of the pressure difference sensor 65 are inserted through the slit portion 21d, and as indicated by the bold arrow in FIG. 8, the sensor housing of the pressure difference sensor 65 is caused to slide to the right to be inserted in the bent portion 21a from the open side of the bent portion 21a. In this manner, the pressure difference sensor 65 connected to the rear DPF 51 through the pipes 81 and 82 can be easily disposed in the bent portion 21a.

In this embodiment, the tilt portion 21b has an attachment hole, and the pressure difference sensor 65 is fixed to the tilt portion 21b with a bolt as illustrated in FIG. 9. However, the present invention is not limited to this method, and the pressure difference sensor 65 may be fixed to the bent portion 21a in any appropriate method.

In the manner described above, in this embodiment, the fan shroud 21 for guiding air to the cooling fan 29 is utilized to enable the pressure difference sensor 65 to be supported by a simple structure. Since the fan shroud 21 is disposed between the ECU 25 and the DPF 51, the pipes 81 and 82 from the DPF 51 to the pressure difference sensor 65 can be shortened, and the wire 93 from the pressure difference sensor 65 to the ECU 25 can be shortened.

In this manner, it is unnecessary to additionally provide a member for supporting the pressure difference sensor 65 so that the configuration of the tractor 100 can be simplified and costs can be reduced.

Next, the support structures for the first wire connector 73 and the second wire connector 74 disposed in intermediate portions of the wires 91 and 92 connecting the ECU 25, the oxidation catalyst temperature sensor 63, and the filter temperature sensor 64 will be described mainly with reference to FIG. 10.

First, a configuration of the intake pipe 23 of the tractor 100 according to this embodiment will be briefly described.

As illustrated in FIG. 6, in the tractor 100 according to this embodiment, the ECU 25 is disposed ahead of the DPF 51. The air cleaner 27 is disposed right-forward of the ECU 25. The intake pipe 23 extends rearward from the air cleaner 27 disposed in a front portion of the tractor 100 and passes at the right side of the ECU 25 (i.e., in parallel with the longitudinal direction of the DPF 51), then extends to the vicinity of the right side of the DPF 51, bends to the right and then downward to be connected to the turbocharger 52 of the engine 5. In this manner, the intake pipe 23 has a portion located near the right side of the DPF 51 and disposed along the longitudinal direction of the DPF 51.

Next, the support structures for the first wire connector 73 and the second wire connector 74 will be described.

In the tractor 100 according to this embodiment, the first wire connector 73 and the second wire connector 74 are supported by using a portion of the intake pipe 23 near the DPF 51.

Figure 10:
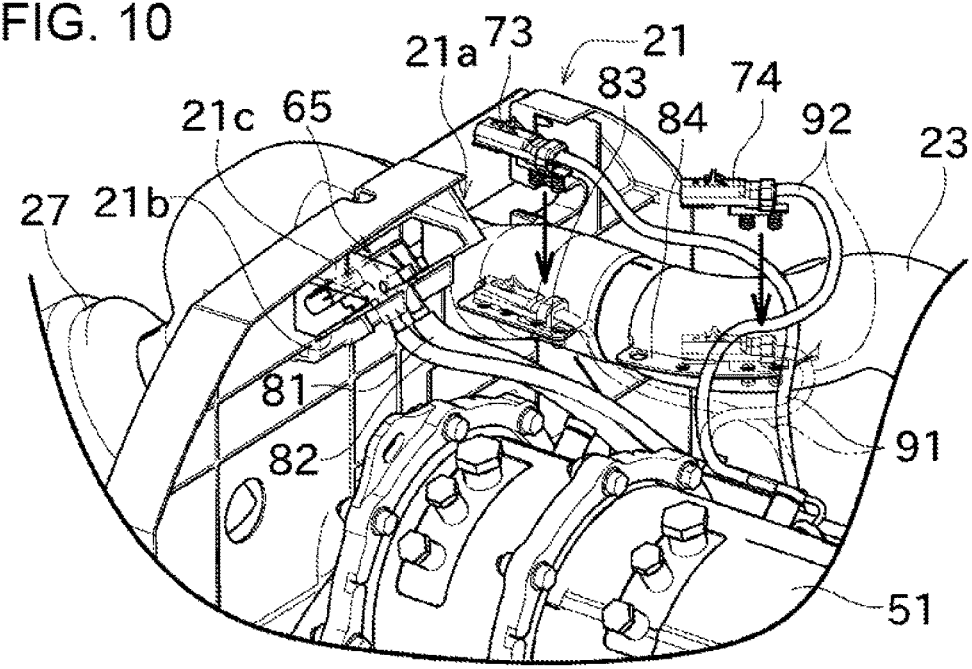
FIG. 10 An enlarged perspective view illustrating support structures for an oxidation catalyst temperature sensor, a filter temperature sensor, and the pressure difference sensor.

Specifically, as illustrated in FIG. 10, the intake pipe 23 includes a first rib 83 and a second rib 84 integrally formed to project toward the DPF 51. The first rib 83 and the second rib 84 are used as support portions of the first wire connector 73 and the second wire connector 74.

The first rib 83 is slender along the body of the intake pipe 23. The length of the first rib 83 is preferably approximately equal to or slightly longer than the length of the first wire connector 73. The width of the first rib 83 projecting from the body of the intake pipe 23 is preferably approximately equal to or slightly larger than the width of the first wire connector 73. In this manner, the first wire connector 73 can be suitably supported by using the first rib 83.

Similarly to the first rib 83, the second rib 84 is slender along the body of the intake pipe 23. The length of the second rib 84 is preferably approximately equal to or slightly longer than the length of the second wire connector 74. The width of the second rib 84 projecting from the body of the intake pipe 23 is preferably approximately equal to or slightly larger than the width of the second wire connector 74. In this manner, the second wire connector 74 can be suitably supported by using the second rib 84.

The first wire connector 73 and the second wire connector 74 are suitably formed to be slender and the longitudinal directions of the first wire connector 73 and the second wire connector 74 are oriented substantially along the longitudinal directions of the first rib 83 and the second rib 84. In this manner, the first wire connector 73 and the second wire connector 74 can be supported in compact space.

As illustrated in FIG. 10, the first rib 83 has an attachment hole penetrating the first rib 83. The connection terminal of the first wire connector 73 at the sensor side is fixed to the first rib 83 by fixing an appropriate fixing tool to the attachment hole. Similarly, the second rib 84 has an attachment hole penetrating the second rib 84, and the connection terminal of the second wire connector 74 at the sensor side is attached to the second rib 84 by fixing an appropriate fixing tool to the attachment hole.

In the manner described above, in this embodiment, the first wire connector 73 and the second wire connector 74 are supported and fixed along the body in a portion of the intake pipe 23 disposed near the DPF 51. Accordingly, the first wire connector 73 and the second wire connector 74 can be strategically disposed by using the arrangement of the intake pipe 23 and the DPF 51 so that the configuration of the tractor 100 can be further simplified. The formation of the first rib 83 and the second rib 84 can enhance rigidity of the intake pipe 23.

As described above, the tractor 100 according to this embodiment includes the engine 5 and the fan shroud 21. The engine 5 includes the DPF 51 for purifying exhaust gas. The fan shroud 21 is disposed ahead of the engine 5. The DPF 51 includes the soot filter 62 for collecting PM of in exhaust gas. The engine 5 includes the pressure difference sensor 65 that detects a pressure difference between the upstream side and the downstream side of the soot filter 62 of the DPF 51 in the direction in which exhaust gas flows. The pressure difference sensor 65 is supported by the fan shroud 21.

In this manner, it is unnecessary to additionally provide a dedicated member for supporting the pressure difference sensor 65 (e.g., the sensor bracket of PTL 1) so that the configuration of the tractor 100 can be simplified, and costs can be reduced.

In the tractor 100 according to this embodiment, the engine 5 includes the upstream pipe 81 and the downstream pipe 82. The upstream pipe 81 connects the upstream side of the soot filter 62 of the DPF 51 to the pressure difference sensor 65. The downstream pipe 82 connects the downstream side of the soot filter 62 to the pressure difference sensor 65. A part of an upper portion of the fan shroud 21 includes the bent portion 21a that is bent toward the DPF 51. The pressure difference sensor 65 is supported by the bent portion 21a.

In this manner, the pressure difference sensor 65 can be supported by a simple configuration. In addition, since the pressure difference sensor 65 is disposed at a position close to the DPF 51, the lengths of the upstream pipe 81 and the downstream pipe 82 to the pressure difference sensor 65 can be reduced.

In the tractor 100 according to this embodiment, the engine 5 includes the intake pipe 23, the oxidation catalyst temperature sensor 63, the filter temperature sensor 64, and the ECU 25. The intake pipe 23 guides air sucked from the outside. The oxidation catalyst temperature sensor 63 detects an exhaust gas temperature at a side upstream of the oxidation catalyst 61 inside the DPF 51. The filter temperature sensor 64 detects an exhaust gas temperature in the upstream side of the soot filter 62 (between the oxidation catalyst 61 and the soot filter 62). The ECU 25 receives detection results of the oxidation catalyst temperature sensor 63 and the filter temperature sensor 64. The first wire connector 73 and the second wire connector 74 are disposed in the intermediate portions of the wires 91 and 92 from the oxidation catalyst temperature sensor 63 and the filter temperature sensor 64 to the ECU 25. The first wire connector 73 and the second wire connector 74 are supported by the intake pipe 23.

In this manner, it is unnecessary to additionally provide a dedicated member for supporting each of the first wire connector 73 and the second wire connector 74. Thus, the configuration of the tractor 100 can be further simplified.

In the tractor 100 according to this embodiment, at least a part of the intake pipe 23 is disposed near the DPF 51 along the longitudinal direction of the DPF 51. The intake pipe 23 includes the first rib 83 and the second rib 84 integrally shaped to project toward the DPF 51. The first wire connector 73 and the second wire connector 74 are supported by the first rib 83 and the second rib 84 of the intake pipe 23.

In this manner, by using a part of the intake pipe 23 disposed near the DPF 51, the first wire connector 73 and the second wire connector 74 can be supported with a more strategical configuration. In addition, since the intake pipe 23 includes the first rib 83 and the second rib 84, the first wire connector 73 and the second wire connector 74 can be more easily supported.

In the tractor 100 according to this embodiment, the first wire connector 73 and the second wire connector 74 are supported by the ribbed portions of the intake pipe 23 (i.e., the first rib 83 and the second rib 84).

In this manner, the wire connectors of the oxidation catalyst temperature sensor 63 and the filter temperature sensor 64 can be suitably supported with the simple configuration, and rigidity of the intake pipe can be enhanced.

Figure 11:
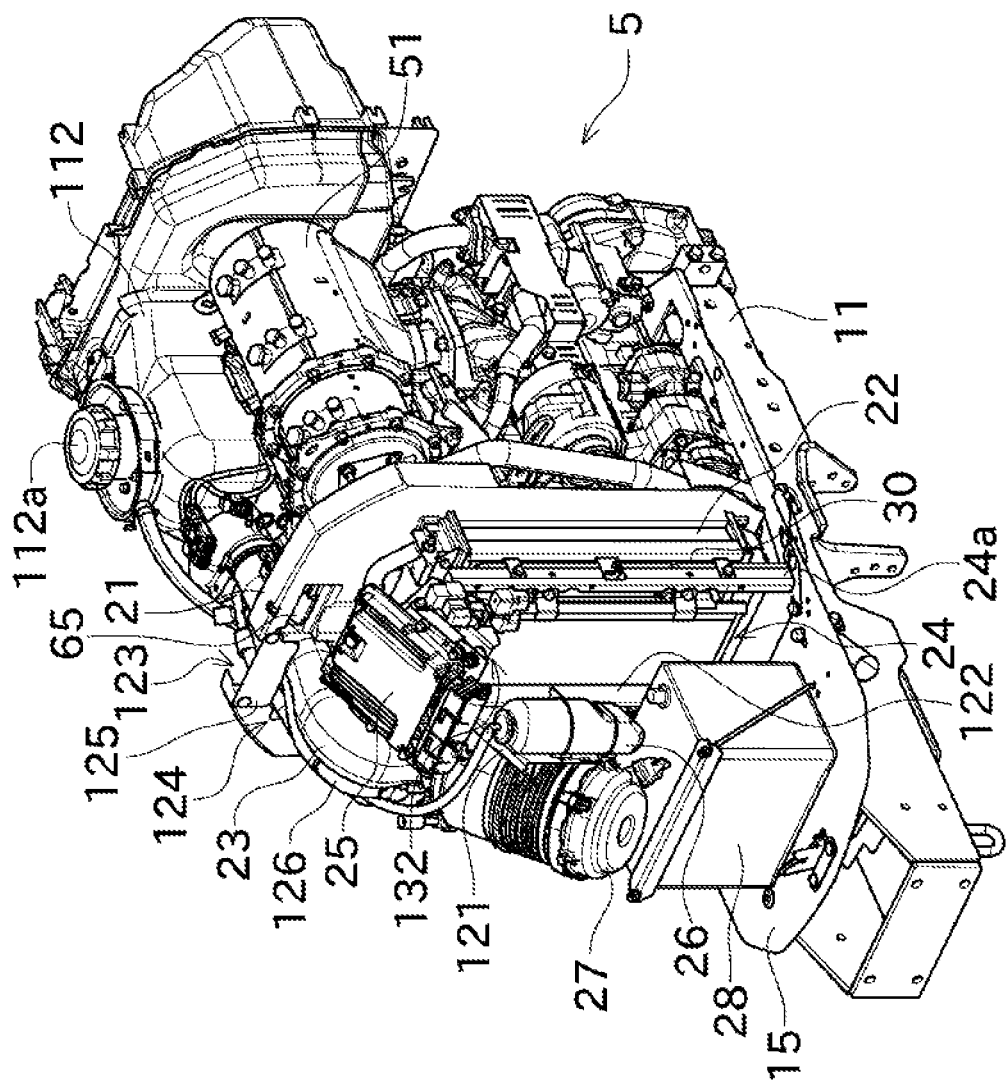
FIG. 11 A perspective view illustrating a state inside the hood.
Figure 12:
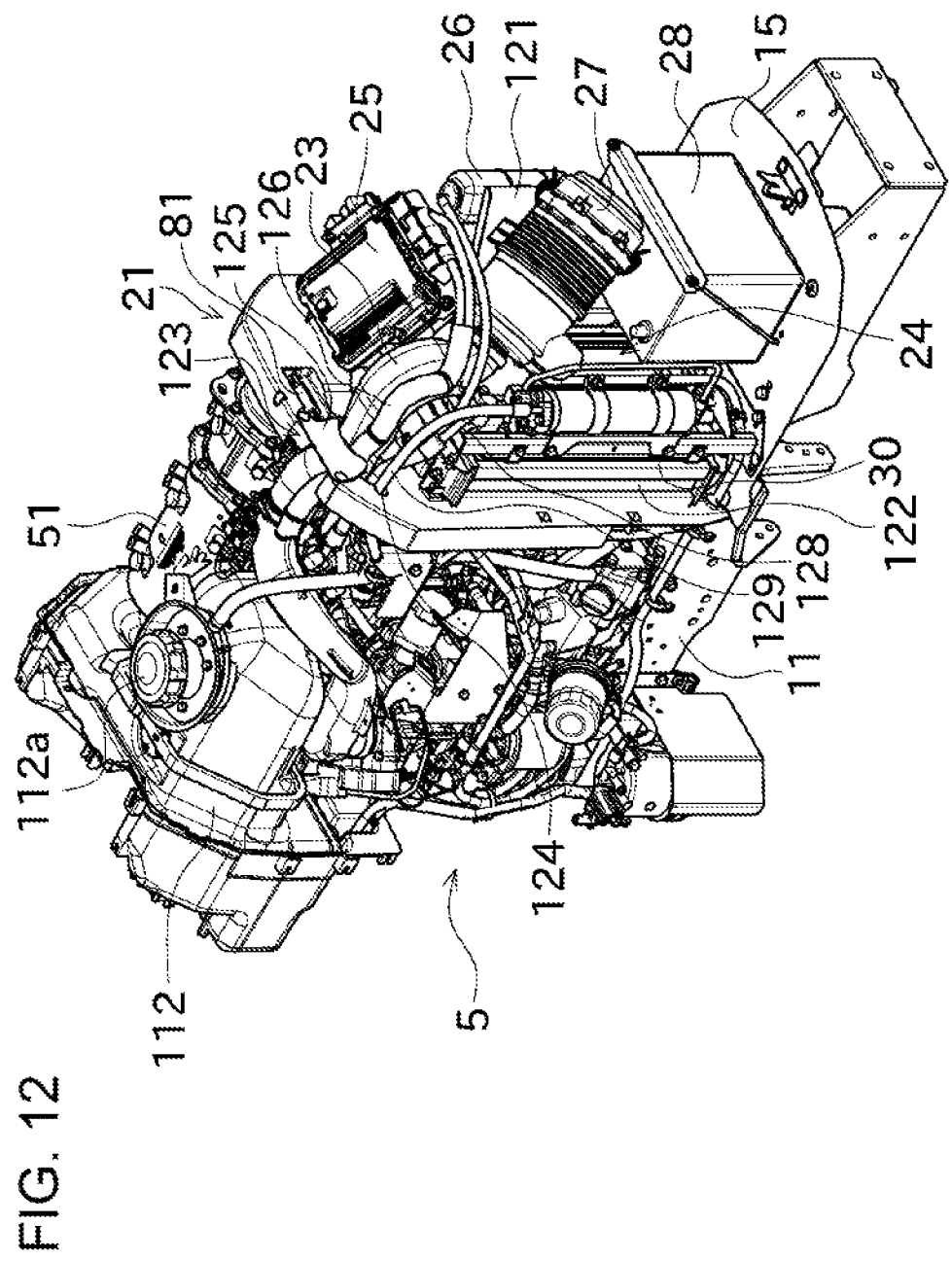
FIG. 12 A perspective view illustrating the state inside the hood.
Figure 13:
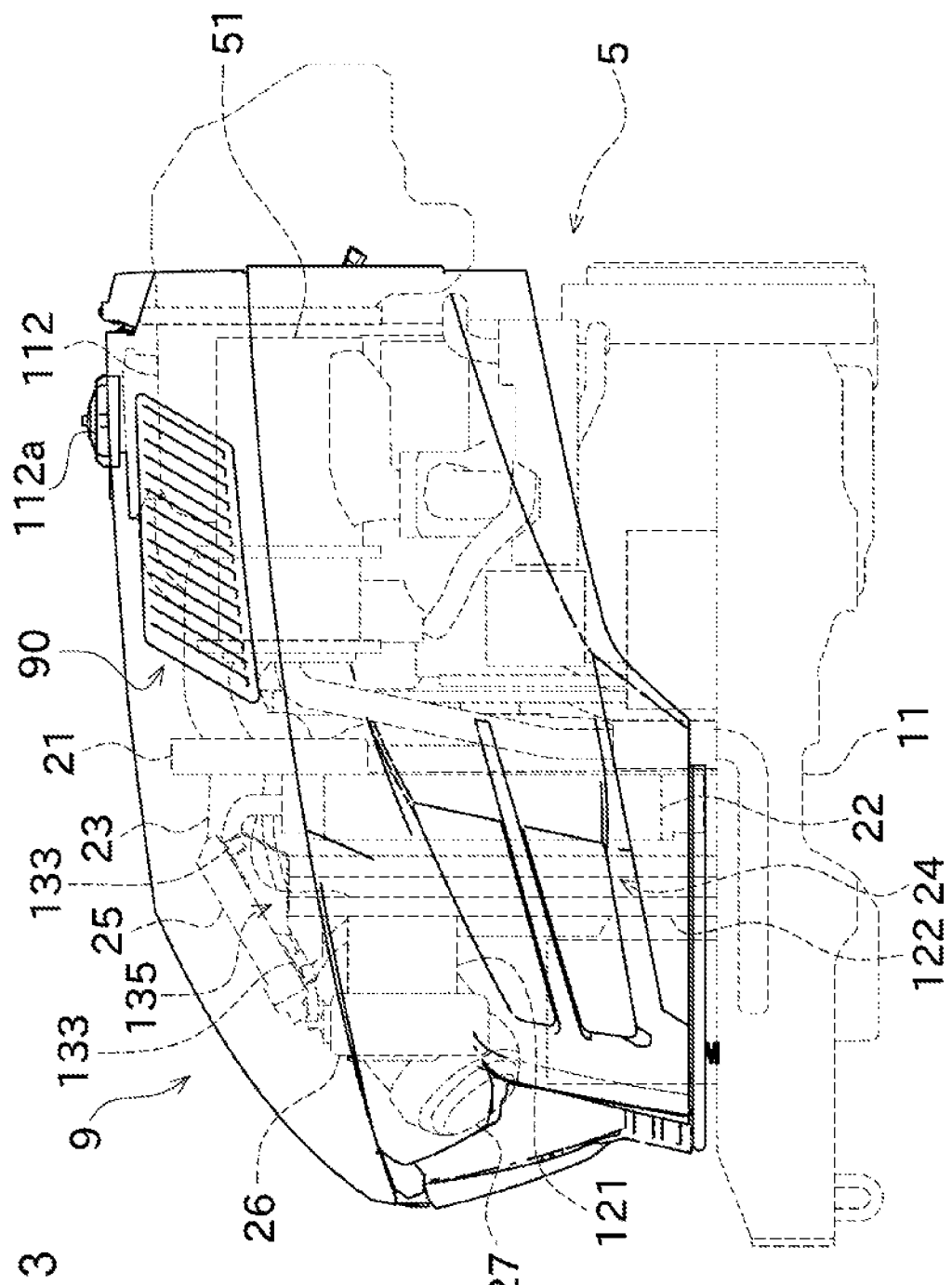
FIG. 13 A right side view illustrating a positional relationship between the hood and the internal configuration of the hood.
Figure 14:
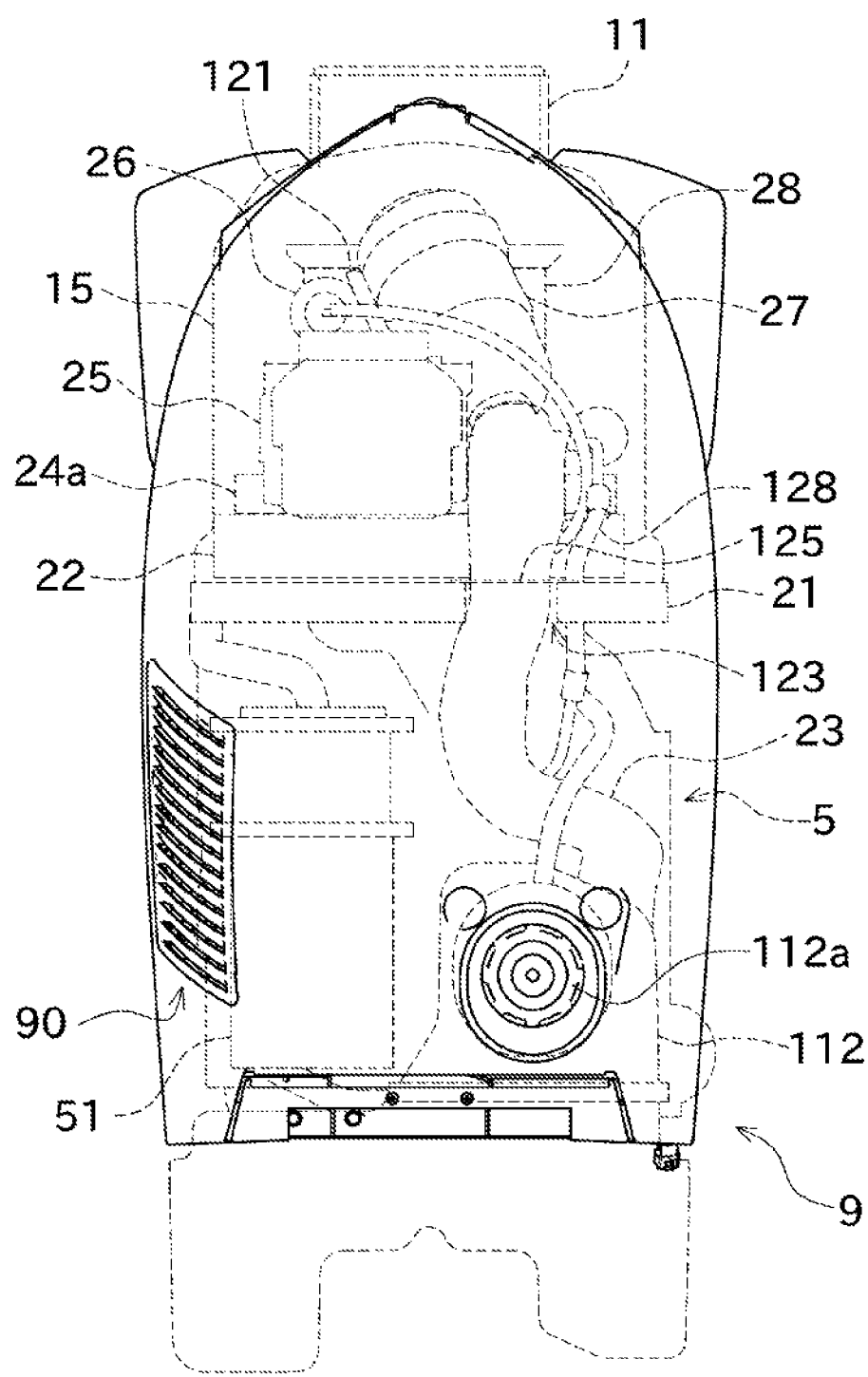
FIG. 14 A plan view illustrating a positional relationship between the hood and the internal configuration of the hood.

With reference now to FIGS. 11 through 14, a positional relationship between the exhaust holes 90 of the hood 9 and the DPF 51 will be described. FIGS. 11 and 12 are perspective views illustrating a state inside the hood 9. FIG. 13 is a right side view illustrating a positional relationship between the hood 9 and an internal configuration of the hood 9. FIG. 10 is a top view illustrating the positional relationship between the hood 9 and the internal configuration of the hood 9.

The engine 5 is disposed above a rear portion of the engine frame 11, and the hood 9 is disposed to cover the engine 5. The engine 5 is disposed in a rear portion of the internal space of the hood 9. The DPF 51 is attached to an upper left side of the engine 5. The DPF 51 is disposed at a position offset to the left from the lateral center of the internal space of the hood 9 in plan view while the hood 9 is closed.

On the other hand, the exhaust holes 90 are formed in the left side wall of the rear portion of the hood 9 (i.e., a side wall to which the DPF 51 is offset). Specifically, the hood 9 includes left and right side walls, an upper wall connecting upper ends of the side walls, and a front wall connecting the front ends of the wide walls. As illustrated in FIG. 2, the left and right side walls are oriented substantially vertically, and upper portions thereof are smoothly connected to the upper wall while being tilted.

The exhaust holes 90 are disposed in an upper portion of the left side wall of the hood 9 facing toward the top left. The exhaust holes 90 are constituted by a plurality of slits that are arranged in the longitudinal direction, are slender in substantially the vertical direction, and penetrate the wall. The exhaust holes 90 are disposed to be located near the DPF 51 while the hood 9 is closed. In side view, the exhaust holes 90 at least partially overlap with the DPF 51. In this manner, heat dissipated from the DPF 51 is efficiently released from the exhaust holes 90 so that problems due to high temperature of devices and components of the engine room (internal space of hood 9) are less likely to occur.

The DPF 51 is shaped in a cylindrical shape whose axial length is larger than the diameter thereof. The DPF 51 has its axial direction oriented in parallel with the longitudinal direction of the tractor 100. Thus, the DPF 51 has a rectangular shape that is slender in the longitudinal length in side view. In this manner, the cylindrical surface of the DPF 51 is disposed to face the side wall of the hood 9, and thus, the area of the DPF 51 projected on the side wall of the hood 9 increases, and an area where the DPF 51 overlaps with the exhaust holes 90 in side view can be easily increased. Consequently, heat release efficiency of the engine room (internal space of the hood 9) can be further enhanced.

Arrangement of the air cleaner 27 will now be described. As described above, the fan shroud 21 is disposed ahead of the engine 5 (ahead of the DPF 51), and the air cleaner 27 is disposed ahead of the fan shroud 21. The air cleaner 27 is disposed at a level higher than the battery 28. In this manner, as illustrated in FIGS. 2 and 3, an operator can easily access the air cleaner 27 while the hood 9 is open. Thus, maintenance of the air cleaner 27 can be easily performed.

A support rod 122 is disposed to pass between the condenser 24 and the battery 28 in the vertical direction (in some of the drawings, the support rod 122 is not shown). The support rod 122 is fixed to the upper surface of the plate-shaped attachment plate 15 fixed to the engine frame 11 in such a manner that the longitudinal direction of the support rod 122 coincides with the vertical direction.

The upper end of the support rod 122 is fixed to the support plate 132 fixed to an upper portion of the condenser frame 24a in order to support the ECU 25 in a vibration controlled manner. Accordingly, the support rod 122 can be more firmly attached.

A rear portion of the flat plate-shaped support bracket 121 is fixed in a cantilevered manner to an upper portion of the support rod 122. The support bracket 121 is oriented to have its thickness direction oriented horizontally. In plan view, the support bracket 121 is disposed to tilt to the left toward the front.

The air cleaner 27 is fixed to the right side surface of the support bracket 121 with a bolt that is a fixture. On the other hand, the sub-tank 26 is fixed to be inserted into a dedicated fixture at the left side surface of the support bracket 121 (the side opposite to the side to which the air cleaner 27 is attached). In this manner, the sub-tank 26 is fixed to the support bracket 121 to which the air cleaner 27 is fixed, and thus, no special support bracket for fixing the sub-tank 26 is needed. Accordingly, the number of components can be reduced so that costs can be reduced.

Figure 4:
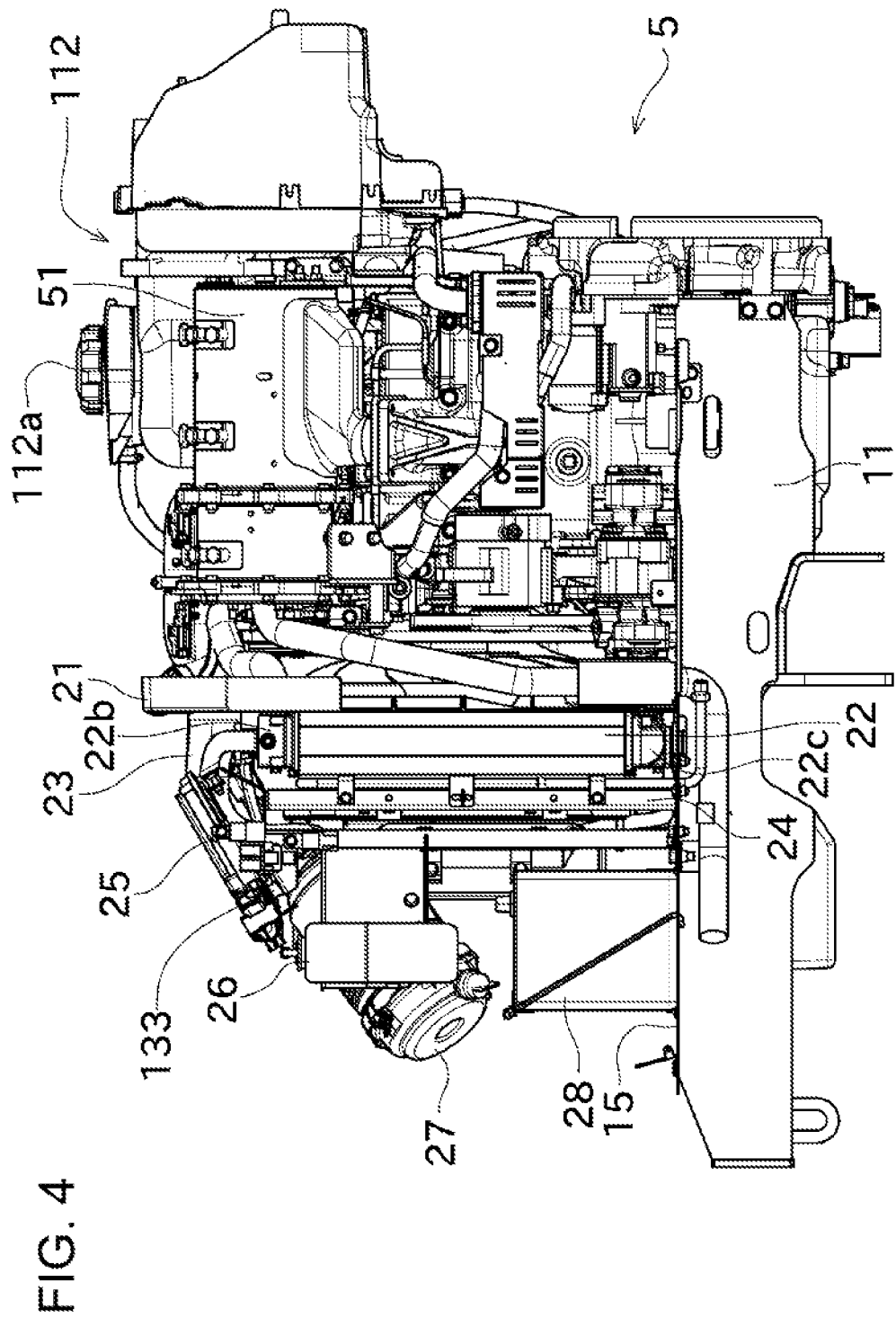
FIG. 4 A side view illustrating the internal configuration of the hood.

As illustrated in FIG. 4, for example, the air cleaner 27 is disposed to decline forward. Since the air cleaner 27 is attached to the support bracket 121, the air cleaner 27 is disposed along the support bracket 121 in plan view (i.e., tilts to the left toward the front). In this manner, even in the case where the hood 9 has a streamline shape and the lateral width of a front portion of the inner space of the hood 9 decreases toward the front as described above, the air cleaner 27 can be easily disposed not to interfere with the inner wall of the hood 9 as illustrated in FIG. 2, for example.

As described above, the tractor 100 according to this embodiment is equipped with the engine 5 and includes the DPF 51 and the hood 9. The DPF 51 is attached to an upper portion of the engine 5. The hood 9 has the exhaust holes 90 that at least partially overlap with the DPF 51 in side view. The DPF 51 is disposed toward one side relative to the lateral center in the hood 9. The exhaust holes 90 are formed in at least one of the left and right side walls of the hood 9 on which the DPF 51 is disposed.

In this manner, heat dissipated from the DPF 51 is efficiently released from the hood 9 through the exhaust holes 90. Consequently, problems due to high temperature of devices and components in the engine room (internal space of the hood 9) are less likely to occur.

In the tractor 100 according to this embodiment, the DPF 51 has a cylindrical shape whose axial length is larger than the diameter thereof, and the axial direction of the DPF 51 is parallel to the longitudinal direction of the tractor 100.

In this manner, the area on which the DPF 51 is projected on the side wall of the hood 9 is larger than that in a case where the axial direction of the cylindrical shape of the DPF 51 is oriented in the lateral direction. As a result, the area in which the DPF 51 and the exhaust holes 90 overlap with each other in side view can be easily increased, and heat release efficiency in the engine room (internal space of the hood 9) can be further enhanced.

In the tractor 100 according to this embodiment, the fan shroud 21 is disposed ahead of the engine 5 and the DPF 51, and the air cleaner 27 is disposed ahead of the fan shroud 21.

Accordingly, arrangement in which the operator can easily access the air cleaner 27 while the hood 9 is open can be achieved. As a result, maintenance of the air cleaner 27 can be easily performed. In addition to the configuration in which heat of the DPF 51 can be easily released from the exhaust holes 90, since the fan shroud 21 is disposed between the DPF 51 and the air cleaner 27, the air cleaner 27 is less affected by heat from the DPF 51.

In the tractor 100 according to this embodiment, the air cleaner 27 is fixed to the support bracket 121 disposed ahead of the fan shroud 21, and the sub-tank 26 for storing cooling water for the radiator 22 is fixed to the support bracket 121.

In this manner, no special support bracket for fixing the sub-tank 26 is needed so that the number of components can be reduced. Thus, costs can be reduced.

In the tractor 100 according to this embodiment, the support bracket 121 tilts to the left or right toward the front in plan view. In plan view, the air cleaner 27 is disposed to tilt to the left or right along the orientation of the support bracket 121.

In this manner, even in the case where the lateral width of the inner space of the front portion of the hood 9 decreases toward the front as in this embodiment, the air cleaner 27 can be disposed not to interfere with the inner wall of the hood 9 with a simple configuration.

Figure 15:
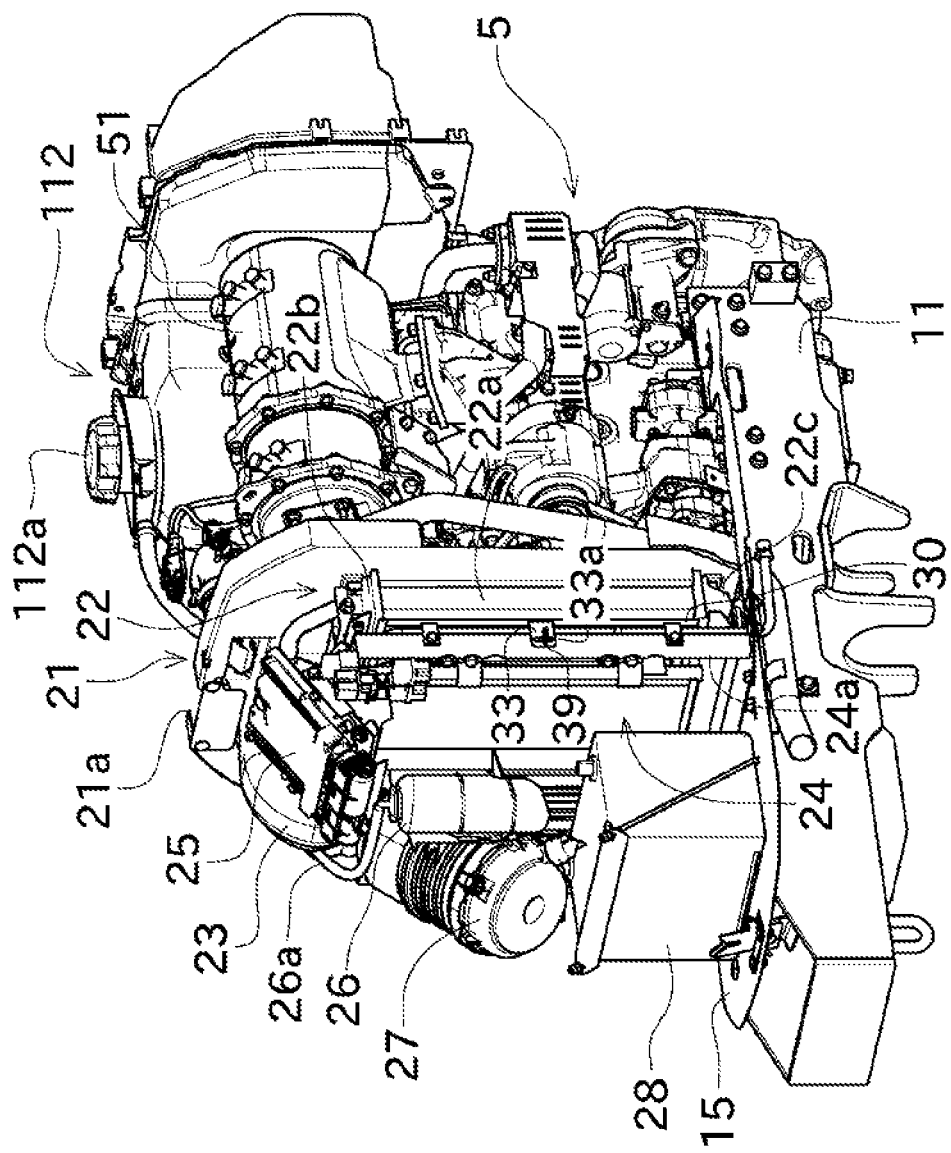
FIG. 15 A perspective view illustrating the internal configuration of the hood.
Figure 16:
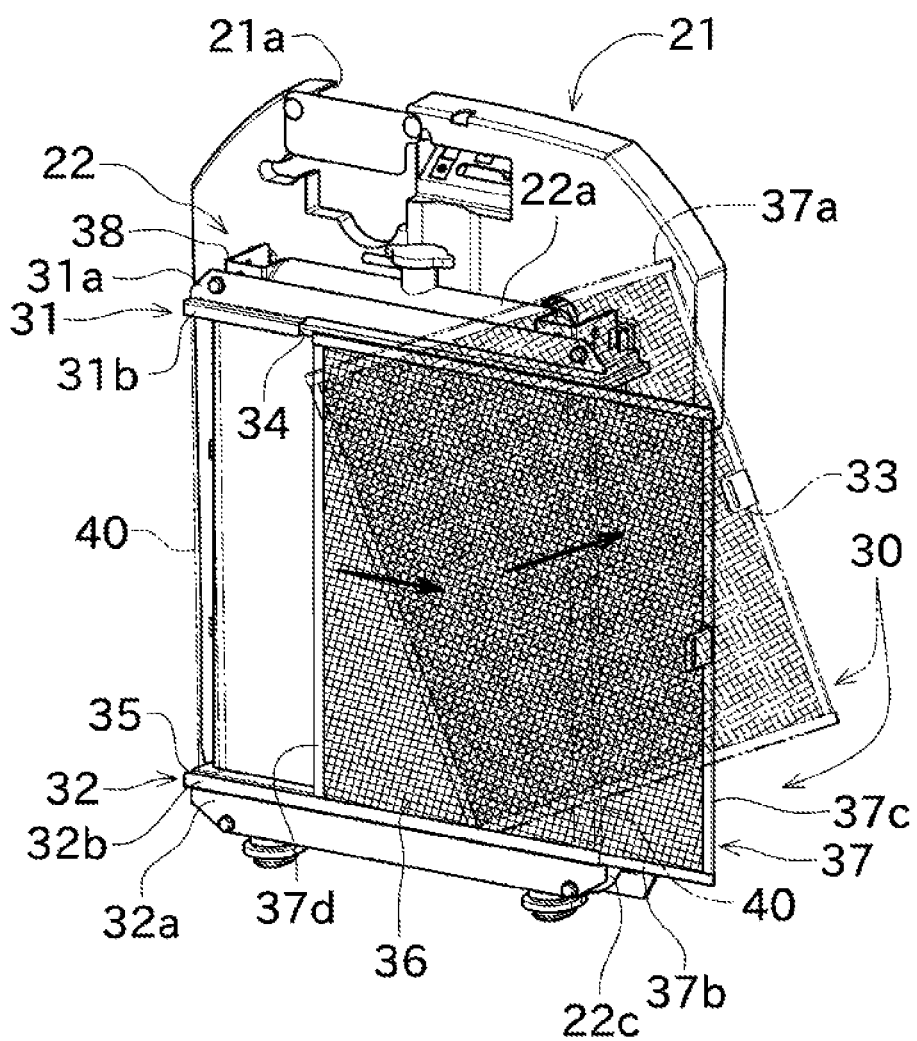
FIG. 16 A view illustrating a state in which a dust screen is drawn out.
Figure 17:
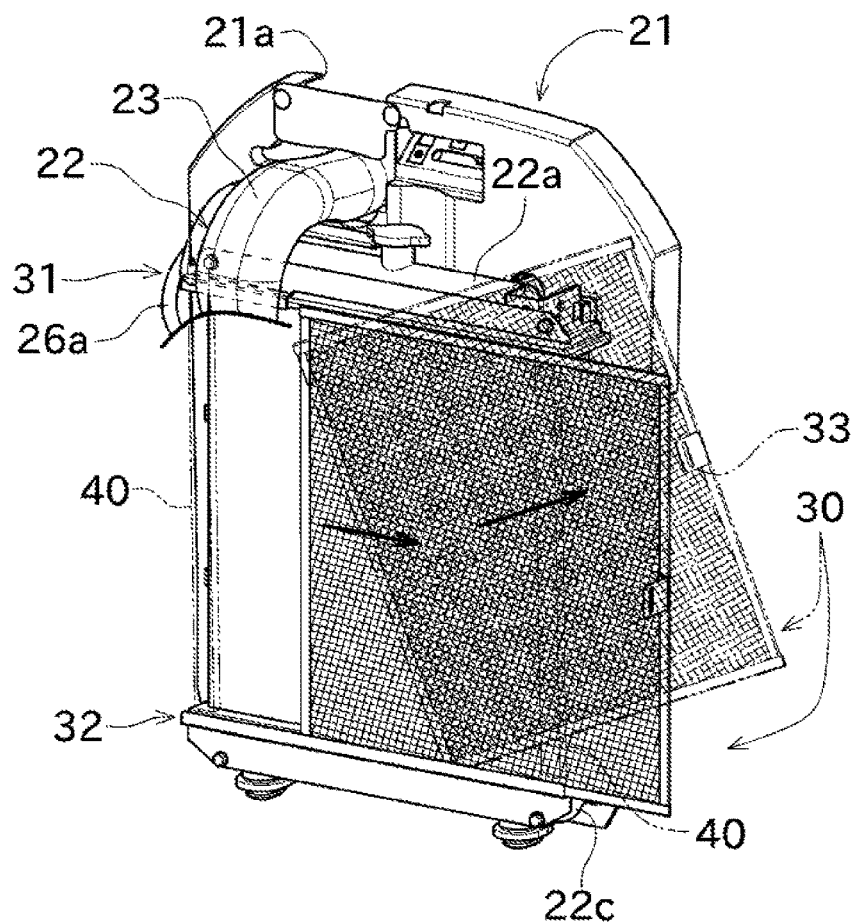
FIG. 17 A view illustrating a state in which another member passes above a first restriction member.
Figure 18:
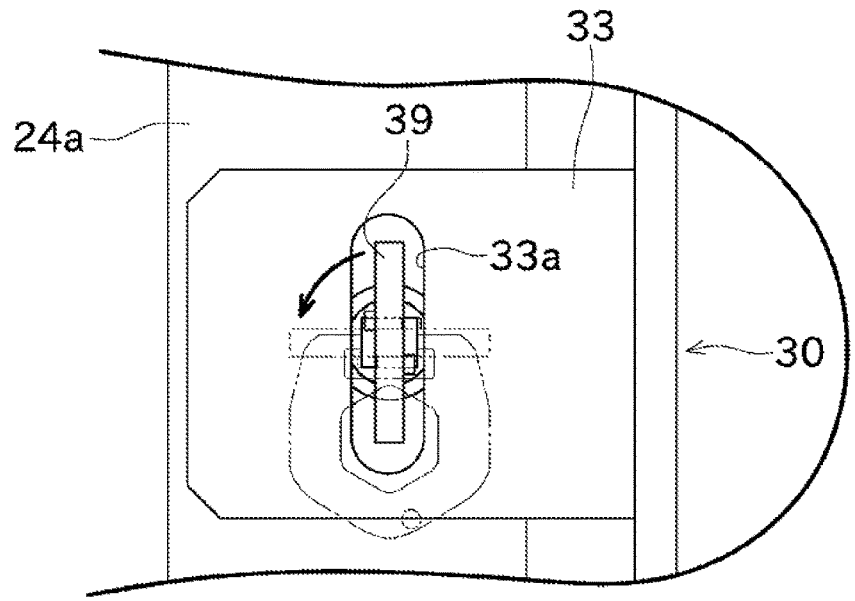
FIG. 18 A side view illustrating a cum lock of the dust screen in an enlarged manner.

With reference now to FIGS. 15 through 18, a dust-proof structure of the radiator 22 will be described in detail. FIG. 15 is a perspective view illustrating the internal configuration of the hood 9. FIG. 16 is a view illustrating a state in which a dust screen 30 is drawn out. FIG. 17 is a view illustrating a state in which another member passes above an upper restriction member 31. FIG. 18 is a side view illustrating a cam lock of the dust screen 30 in an enlarged manner.

During work of the tractor 100, foreign matter such as weeds, straw scraps, and dust can enter the radiator 22 together with the flow of air taken into the radiator 22. When the entering of the foreign matter causes clogging of the fin of the radiator 22 (cooling core 22a), the cooling effect of the radiator 22 decreases.

To prevent occurrence of the clogging, the radiator 22 of the tractor 100 according to this embodiment includes the dust screen (dust-proof member) 30 disposed on the surface (front surface) of the cooling core 22a at the air intake side so that the dust screen catches the foreign matter to prevent the foreign matter from flowing into the cooling core 22a.

When the foreign matter is deposited on the dust screen 30 to cause clogging, the air flowability decreases. Thus, the dust screen needs to be cleaned at an appropriate timing. In view of this, in this embodiment, the dust screen 30 is detachably attached to the radiator 22 in order to easily clean the dust screen 30.

Next, the dust-proof structure of the radiator 22 will be described in detail.

As illustrated in FIGS. 15 and 16, the radiator 22 of the tractor 100 according to this embodiment includes the dust screen 30 and the upper restriction member (first restriction member) 31 and a lower restriction member (second restriction member) 32 that support the dust screen 30 so that the dust screen 30 can slide laterally.

The dust screen 30 has a thin flat plate shape as illustrated in FIG. 16, and is constituted by a mesh member 36 and a rectangular screen frame 37. The mesh member 36 is configured as a perforated metal, and has such a size that can cover the entire surface of the cooling core 22a upstream (ahead) of the cooling core 22a in a flow of air taken by the cooling fan 29.

The screen frame 37 is configured to be rectangular to cover an end portion of the mesh member 36, and includes an upper frame 37a and a lower frame 37b extending laterally and a left frame 37c and a right frame 37d extending vertically. The upper frame 37a and the lower frame 37b of the screen frame 37 are restricted by the upper restriction member 31 and the lower restriction member 32, respectively.

The upper restriction member 31 is formed into a slender shape in the lateral direction by bending a plate-shaped member, and includes an attachment part 31a and a restriction part 31b. The attachment part 31a is attached to an upper attachment part 38 disposed in an upper portion of the radiator 22 with a bolt, for example.

The upper restriction member 31 is formed by bending edge portions of a metal plate member at two points vertically in opposite directions (i.e., bending the metal plate member into a zigzag pattern).

In this configuration, as illustrated in FIG. 16, a guide part 34 that holds the upper frame 37a of the dust screen 30 to allow the dust screen 30 to slide laterally is formed between the restriction part 31b of the upper restriction member 31 attached to the upper attachment part 38 and the radiator 22.

The guide part 34 is open at the bottom and is formed into a slender horizontal groove shape whose lateral ends (longitudinal ends) are open.

A lateral dimension of the attachment part 31a of the upper restriction member 31 is approximately equal to the lateral dimension of the dust screen 30. On the other hand, the restriction part 31b of the upper restriction member 31 is shorter than the attachment part 31a (specifically, has a length less than or equal to ½, or further less than or equal to ⅓, of the attachment part 31a), and is disposed only in a portion including a right end of the upper restriction member 31. In this manner, a part of a right portion of the upper frame 37a of the dust screen 30 is restricted by the upper restriction member 31.

In a manner similar to the upper restriction member 31, the lower restriction member 32 is formed into a slender shape in the lateral direction by bending a plate-shaped member, and includes an attachment part 32a and a restriction part 32b. The attachment part 32a is attached to the lower tank 22c disposed in a lower portion of the radiator 22 with a bolt, for example.

Examples of the structure for attaching the attachment part 32a include a structure in which the outer wall of the lower tank 22c is made partially thick to form an attachment portion enabling the attachment part 32a to be bolted. The present invention, however, is not limited to this structure, and an attachment member is additionally provided in the lower tank 22c so that the attachment part 32a can be fixed to this attachment member.

The lower restriction member 32 is formed by bending edge portions of a metal plate member at two points vertically in opposite directions (i.e., bending the metal plate member into a zigzag pattern).

In this configuration, a guide part 35 that holds the lower frame 37b of the dust screen 30 to allow the dust screen 30 to slide laterally is formed between the radiator 22 and the restriction part 32b of the lower restriction member 32 attached to the radiator 22. The guide part 35 is open at the top and is formed into a slender horizontal groove shape whose lateral ends (longitudinal ends) are open.

This guide part 35 is disposed to be parallel to the guide part 34. In a manner different from the restriction part 31b of the upper restriction member 31, a lateral dimension of the restriction part 32b of the lower restriction member 32 is approximately equal to a lateral dimension of the dust screen 30.

With the configuration described above, the dust screen 30 is held at the front surface of the cooling core 22a while being restricted in position by the upper restriction member 31 and the lower restriction member 32. Specifically, upward movement of the dust screen 30 is restricted by the guide part 34, and downward movement of the dust screen 30 is restricted by the guide part 35. Forward movement of the dust screen 30 is restricted by the two guide parts 34 and 35, and rearward movement of the dust screen 30 is restricted by the cooling core 22a. It should be noted that lateral movement of the dust screen 30 is not restricted, and thus, the dust screen 30 can slide laterally.

As illustrated in FIG. 1, upper portions of the front wheels 3 of the tractor 100 are disposed at the left and right of the radiator 22. With some tread widths of the front wheels 3, each of the front wheels 3 is separated from the radiator 22 only at a distance less than the lateral width of the dust screen 30 in some cases. In such cases, even if the dust screen 30 were configured to be drawn out by simply sliding the dust screen 30 in the lateral horizontal direction, the front wheels 3 would hinder removal of the dust screen 30.

On the other hand, in the dust screen 30 according to this embodiment, the restriction part 31b of the upper restriction member 31 is short, and only a part of the right portion of the upper frame 37a of the dust screen 30 is restricted. Thus, as illustrated in FIG. 16, in a state where the dust screen 30 is caused to slightly slide to the left so that the upper frame 37a is not restricted by the upper restriction member 31, the dust screen 30 can be drawn out obliquely upward.

This configuration can enhance flexibility in the direction of drawing the dust screen 30 from the radiator 22. Thus, even if a space of a dimension greater than or equal to the lateral width of the dust screen 30 is not present in the lateral direction of the dust screen 30, the dust screen 30 can be drawn out smoothly. In this manner, spaces at the left and right of the radiator 22 can be effectively utilized so that flexibility in arranging other components (devices) around the radiator 22 can be increased.

A part of the right portion of the upper edge of the dust screen 30 is restricted not to move upward by the restriction part 31b of the upper restriction member 31. Accordingly, a path for attaching/detaching the dust screen 30 does not pass over the restriction part 31b, even in a configuration in which the intake pipe 23 and the hose 26a pass over the right portion of the dust screen 30 as illustrated in FIG. 17, the dust screen 30 can be attached and detached smoothly. Thus, both reduction of the size of the configuration of the tractor 100 by effectively utilizing the space above the radiator 22 and easiness of maintenance of the dust screen 30 can be achieved.

In the tractor 100 according to this embodiment, the left frame 37c of the dust screen 30 includes a lock portion 33 in order to lock lateral sliding of the dust screen 30 restricted by the upper restriction member 31 and the lower restriction member 32.

The lock portion 33 is attached to a substantially longitudinal center of the left frame 37c to project forward from the dust screen 30. The lock portion 33 is configured as a small plate-shaped member whose thickness direction is oriented in the lateral direction, and a long slit 33a extending vertically is formed through a substantially center portion of the lock portion 33.

On the other hand, an operation tool 39 is attached to the left end of the condenser frame 24a to project to the left. The operation tool 39 is disposed at a position corresponding to the position of the slit 33a of the lock portion 33 in a state where the dust screen 30 is set on the guide parts 34 and 35 to cover the entire air-intake surface of the cooling core 22a.

The operation tool 39 is formed into a flat plate shape and is configured to be rotatable about the horizontal axis extending laterally. The operation tool 39 can pass through the slit 33a formed in the lock portion 33 in a state where the thickness direction of the operation tool 39 is oriented longitudinally. On the other hand, in a state where the operation tool 39 is rotated to have its thickness direction oriented vertically, the operation tool 39 cannot pass through the slit 33a. From a state in which the operation tool 39 has its thickness direction oriented vertically and projects to the left, the operation tool 39 can be rotated to bend downward from a base portion with respect to the horizontal axis extending longitudinally.

In this configuration, to attach the dust screen 30 to the front surface of the radiator 22, as indicated by the solid line in FIG. 18, the operation tool 39 is first oriented to have its thickness direction directed longitudinally. The dust screen 30 is then inserted in the guide parts 34 and 35 and is caused to slide to the left so that the slit 33a of the lock portion 33 passes over the operation tool 39. In a state where the lock portion 33 is in contact with the left side surface of the condenser frame 24a, the operation tool 39 is rotated as indicated by the arrow in FIG. 18 so that the thickness direction of the operation tool 39 is oriented vertically. In this manner, the slit 33a is not detached from the operation tool 39 so that lateral movement of the dust screen 30 is restricted (locked state). From this state, the operation tool 39 can be pushed down to rotate so that the operation tool 39 bends downward from the base portion, and thereby, a double lock can be obtained.

In the manner described above, the dust screen 30 can be mechanically fixed to the condenser frame 24a by using the lock portion 33. Accordingly, during work of the tractor 100, lateral displacement of the dust screen 30 due to vibrations or other reasons can be prevented, and thus, the dust screen 30 can be suitably locked at a predetermined position.

In the radiator 22 according to this embodiment, as illustrated in FIG. 16, for example, a pair of cushioning members 40 is disposed in order to prevent foreign matter from entering through a gap between the dust screen 30 and the cooling core 22a. Each of the cushioning members 40 is made of a material having a certain degree of elasticity, is vertically slender, and is attached to lateral ends of the radiator 22 between the dust screen 30 and the cooling core 22a.

With this configuration, in the state where the dust screen 30 is set on the guide parts 34 and 35 so as to cover the entire air-intake surface of the cooling core 22a, the left and right cushioning members 40 can be closely in contact with the left frame 37c and the right frame 37d of the dust screen 30. In this manner, it is possible to avoid entering of foreign matter into the radiator 22 through a gap between the dust screen 30 and the cooling core 22a. In addition, the cushioning members 40 can absorb vibrations of the dust screen 30, and thus, occurrence of noise due to backlash of the dust screen 30 during traveling of the tractor 100 can be prevented.

As described above, the radiator 22 according to this embodiment includes the cooling core 22a, the flat plate-shaped dust screen 30, the upper restriction member 31, and the lower restriction member 32. The dust screen 30 includes the upper frame 37a and the lower frame 37b and is disposed upstream of the cooling core 22a in a direction in which air passing through the cooling core 22a flows. The upper restriction member 31 restricts a part of the right portion of the upper frame 37a of the dust screen 30 in such a manner that the dust screen 30 can slide in parallel with the longitudinal direction of the upper frame 37a and does not move in any of the thickness direction and the upward direction of the dust screen 30. The lower restriction member 32 restricts the lower frame 37b of the dust screen 30 in such a manner that the dust screen 30 can slide in parallel with the longitudinal direction of the lower frame 37b and does not move in any of the thickness direction and the upward direction of the dust screen 30.

In this manner, the dust screen 30 can be suitably restricted, and a structure of drawing the dust screen 30 out in the lateral direction can be obtained. In addition, since only a part of the right portion of the upper frame 37a of the dust screen 30 is restricted by the upper restriction member 31, in a state where the dust screen 30 is slightly drawn horizontally so that the upper frame 37a is not restricted by the upper restriction member 31, the dust screen 30 can be drawn out obliquely upward. Consequently, flexibility in drawing the dust screen 30 can be enhanced so that maintenance can be easily performed.

In the radiator 22 according to this embodiment, immediately above the restriction part 31*b* of the upper restriction member 31, other members (e.g., the intake pipe 23 and the hose 26*a* to the sub-tank 26) are disposed.

In this manner, in drawing the dust screen 30, contact with other members can be avoided, and flexibility in disposing the sub-tank 26 can be enhanced.

In the radiator 22 according to this embodiment, the dust screen 30 is formed into a rectangular shape, and includes the left frame 37*c* and the right frame 37*d* extending vertically. The left frame 37*c* includes the lock portion 33 that can lock sliding of the dust screen 30.

This configuration can lock sliding of the dust screen 30 restricted by the upper restriction member 31 and the lower restriction member 32.

Figure 19:
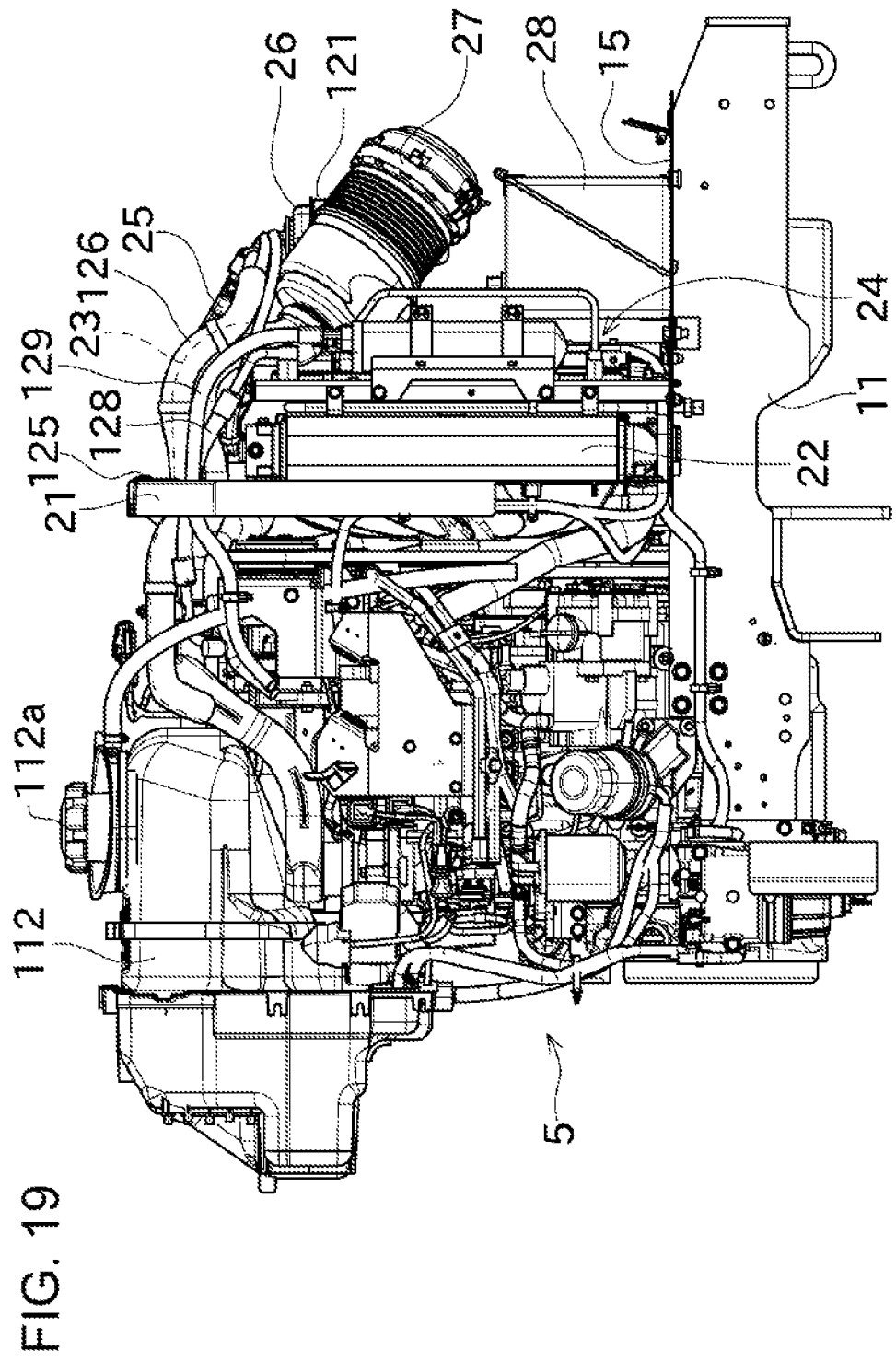
FIG. 19 A left side view illustrating a state inside the hood.
Figure 20:
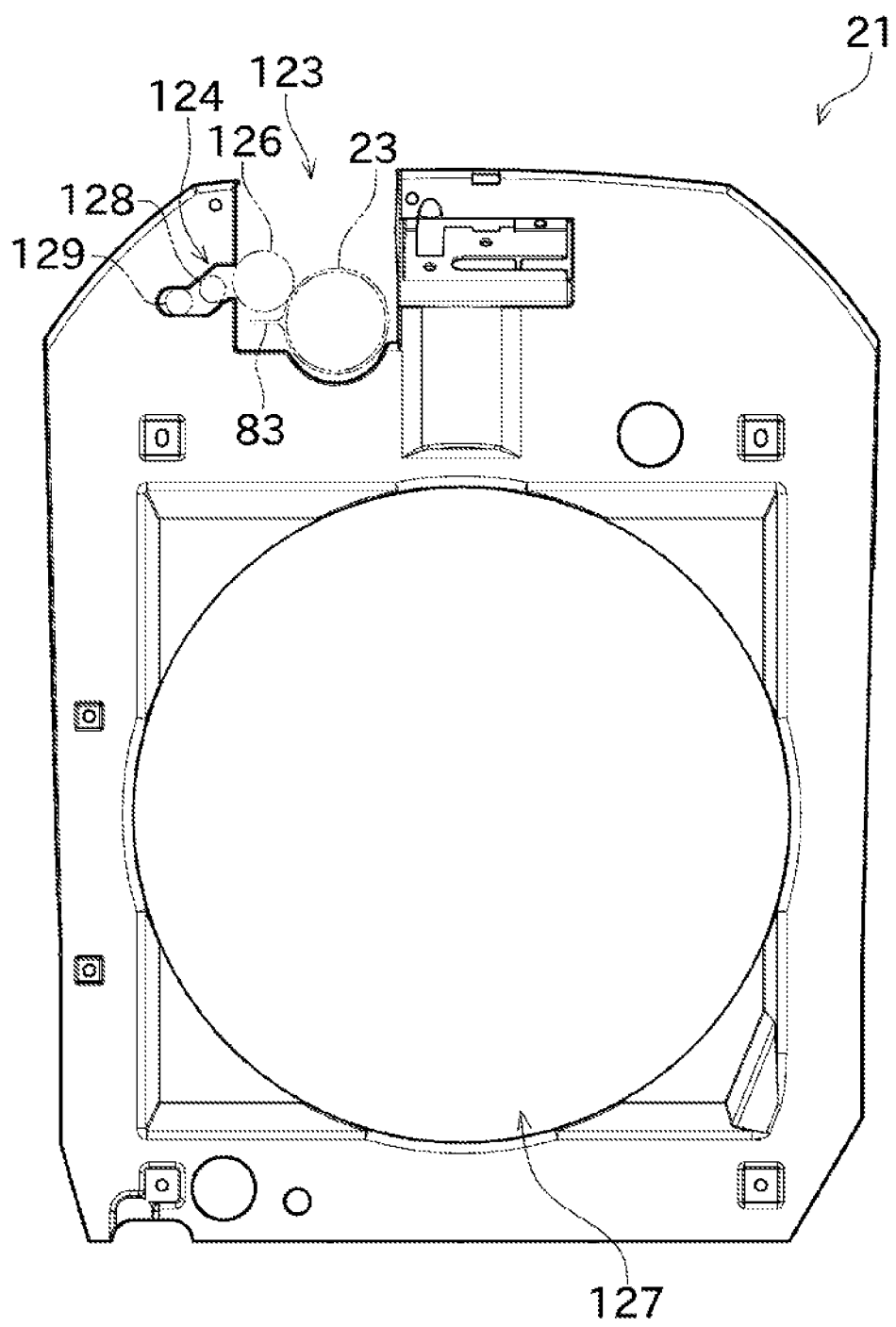
FIG. 20 A front view of a fan shroud.
Figure 21:
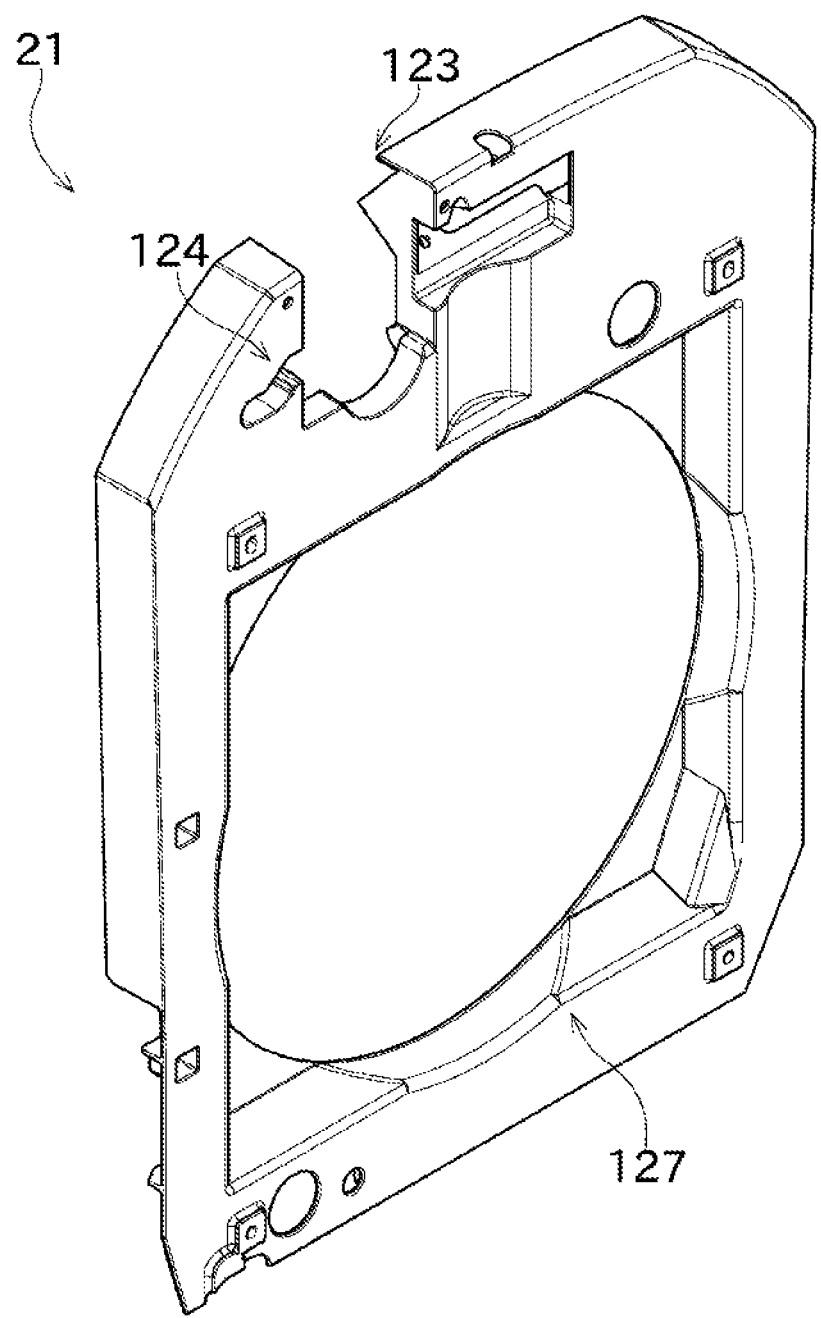
FIG. 21 A perspective view of the fan shroud.
Figure 22:
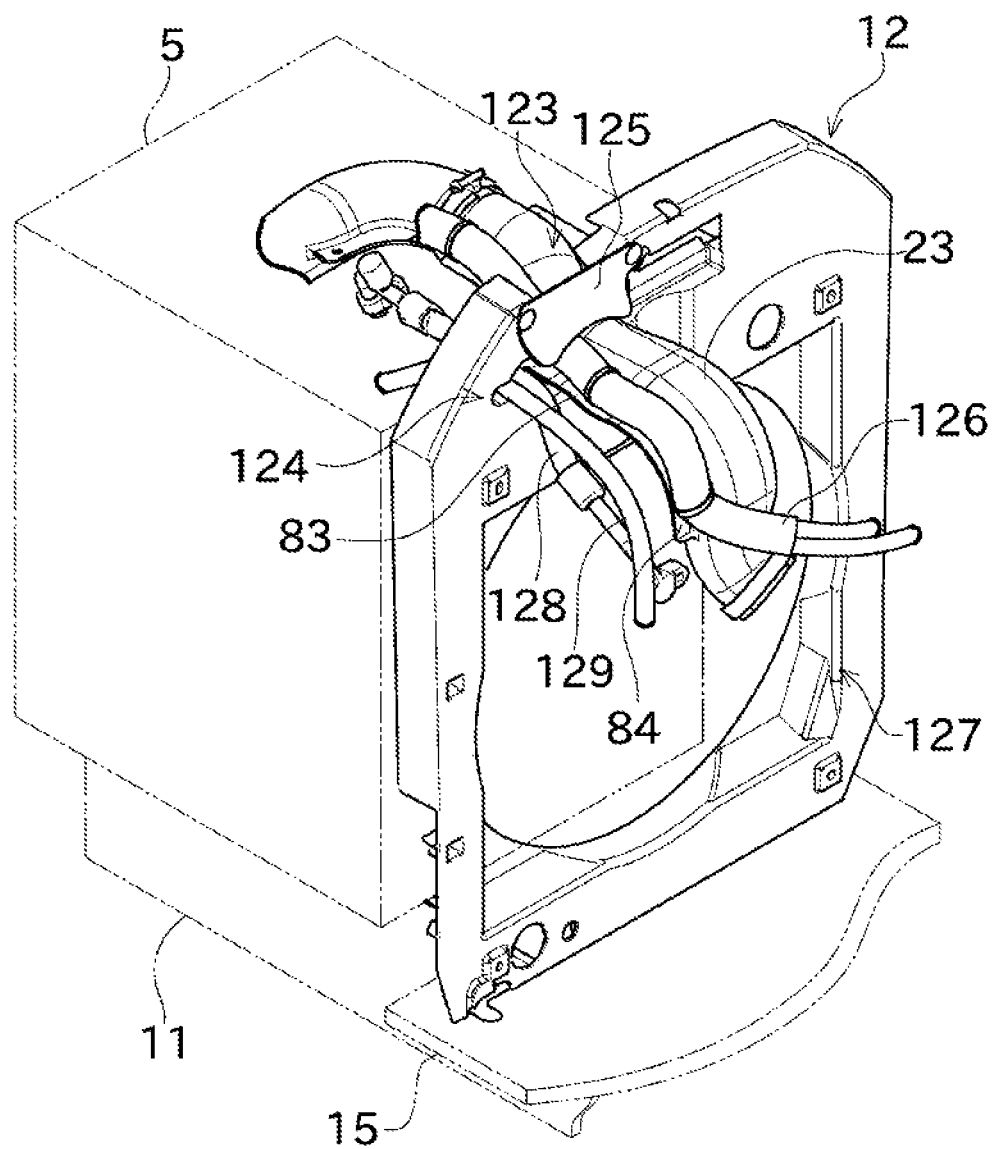
FIG. 22 A perspective view schematically illustrating a state near the fan shroud.

With reference now to FIGS. 19 through 22, the fan shroud 21, which is a feature of the present invention, will be described in detail. FIG. 19 is a left side view illustrating a state inside the hood 9. FIG. 20 is a front view of the fan shroud 21. FIG. 21 is a perspective view of the fan shroud 21. FIG. 22 is a perspective view schematically illustrating a state near the fan shroud 21.

As illustrated in FIG. 20, the fan shroud 21 has a rounded substantially rectangular flat-plate shape. The contours of the left and right edges and the upper edge of the fan shroud 21 are configured to substantially extend along the shape of the inner wall of the hood 9.

In this embodiment, the fan shroud 21 is made of a synthetic resin. Thus, as compared to a case where the fan shroud 21 is made of a conventionally used material such as an SPCC (general-purpose cold rolled steel sheet), a shape suitable for a purpose can be easily obtained.

As illustrated in FIGS. 20 and 21, the notch 123 is formed as a recess formed by cutting the upper end of the fan shroud 21 straight down from a position closer to one of the lateral ends (right in this embodiment). A part of the contour of the lower end of the notch 123 has a semicircular shape (arc shape) extending substantially along the contour of the intake pipe 23. In other word, a part of the contour of the notch 123 (specifically, the contour of the lower end of the notch 123) is formed into an arch shape, which substantially matches with the cross-sectional contour of the intake pipe 23. Accordingly, a gap formed between the intake pipe 23 and the notch 123 when the intake pipe 23 is disposed in the notch 123 can be made small. Consequently, a decrease in heat shield effect by the fan shroud 21 can be reduced.

As described above, the first rib 83 projecting horizontally is formed at one of the lateral ends (right end in this embodiment) of the intake pipe 23. The first rib 83 is slender along the longitudinal direction of the intake pipe 23. The first rib 83 can enhance rigidity of the intake pipe 23. As described above, the first rib 83 also serves as a fixing portion for a band-shaped fixture for disposing the engine harness 126 along the intake pipe 23.

The first rib 83 and the engine harness 126 pass through the notch 123 together with the intake pipe 23. Accordingly, arrangement of the intake pipe 23 and the engine harness 126 can be made compact.

In the fan shroud 21, a second notch 124 is formed to branch from a vertically intermediate portion of the notch 123 to one of the lateral ends (right end in this embodiment). As illustrated in FIG. 20, the second notch 124 is formed as a recess having a slender contour that extends slightly obliquely downward from the branch portion and then extends in the lateral horizontal direction.

Deformable first and second pipes 128 and 129 connected to the condenser 24 and arranged adjacent to each other pass through the second notch 124. In this manner, since the first pipe 128 and the second pipe 129 pass through the second notch 124 different from the notch 123, the first pipe 128 and the second pipe 129 can be arranged as a unit in relation to the intake pipe 23 and the engine harness 126.

As described above, the cooling fan sends outdoor air taken from the front grille to the engine 5 to cool the engine 5. A center portion of the fan shroud 21 includes a cavity 127 for disposing the cooling fan therein. The contour of the cavity 127 has a circular shape along a rotation trajectory of blades of the cooling fan so that cooling air can be efficiently sent from the radiator 22 to the engine 5.

In the case of molding the fan shroud 21 with a mold, a cavity of the mold is shaped to have portions corresponding to the notch 123 and the second notch 124. In this manner, (as compared to a configuration in which the SPCC is punched, for example), the fan shroud 21 having a complicated shape with the notch 123 and the second notch 124 can be easily obtained.

The closing sheet 125 is attached to the upper end of the front surface of the fan shroud 21 to cover the opening of the notch 123 of the fan shroud 21. The closing sheet 125 is configured as a deformable soft sheet material as a whole. Accordingly, even upon application of a vibration or an impact to the tractor 100, the engine harness 126 passing through the intake pipe 23 and the second notch 124 can be retained within a predetermined range so as not to come out of the notch 123. In addition, since the lower end of the closing sheet 125 covers the opening of the notch 123 while deforming along the upper surfaces of the intake pipe 23 and the engine harness 126, the space above the intake pipe 23 can be covered without any gap. As a result, the air-guide effect and the heat shield effect of the fan shroud 21 can be enhanced.

Furthermore, by fixing the closing sheet 125 to the fan shroud 21 with a detachable fixture (e.g., screw), the closing sheet 125 can be easily attached and detached. Accordingly, the intake pipe 23 and the engine harness 126 can be easily attached and detached.

As described above, the tractor 100 according to this embodiment includes the engine 5, the intake pipe 23, and the fan shroud 21. The intake pipe 23 is connected to the engine 5. The fan shroud 21 is disposed ahead of the engine 5. The fan shroud 21 is made of a synthetic resin and formed into a shape including the notch 123. The intake pipe 23 passes through the notch 123.

In this manner, as compared to a case there the intake pipe 23 passes through an engagement hole, the intake pipe 23 can be easily attached or detached to or from the fan shroud 21 for maintenance.

In the tractor 100 according to this embodiment, a part of the contour of the notch 123 is formed along the contour of the intake pipe 23 in cross section.

Accordingly, a gap formed in the notch 123 of the fan shroud 21 can be made small so that degradation of the air-guide effect and the heat shield effect of the fan shroud 21 can be suppressed.

In the tractor 100 according to this embodiment, the fan shroud 21 is formed to have a shape including the second notch 124 branching from the notch 123.

In this manner, a member can be disposed to pass through the second notch 124 in addition to the notch 123.

The tractor 100 according to this embodiment includes the condenser 24. The first pipe 128 and the second pipe 129 connected to the condenser 24 pass through the second notch 124.

In this manner, the first pipe 128 and the second pipe 129 pass through the second notch 124 that is a portion different from the notch 124 through which the intake pipe 23 passes, and thus, paths of pipes connected to the condenser 24 can be arranged as a unit.

In the tractor 100 according to this embodiment, the first rib 83 projecting outward is formed on the intake pipe 23 along the longitudinal direction of the intake pipe 23. The first rib 83 passes through the notch 123.

That is, the fan shroud 21 in which the notch 123 having the complicated shape as in this embodiment can be easily formed is preferably used for allowing the intake pipe 123 having such a complicated shape that has the first rib 83 to pass therethrough.

In the tractor 100 according to this embodiment, the engine harness 126 is fixed to the first rib 83 formed on the intake pipe 23. The engine harness 126 passes through the notch 123.

In this manner, by using the first rib 83, the engine harness 126 can be attached to the intake pipe 23 along the intake pipe 23. In addition, a simple configuration in which the intake pipe 23 and the engine harness 126 pass through one notch 123 can be obtained.

In the tractor 100 according to this embodiment, the engine harness 126 electrically connecting the engine 5 to the ECU 25 passes through the notch 123.

Accordingly, the engine harness 126 can be disposed in a simple path.

In the tractor 100 according to this embodiment, the closing sheet 125 is attached to the opening of the notch 123.

In this manner, since the opening of the notch 123 is closed, even upon application of a vibration or an impact to the tractor 100, the intake pipe 23 can be retained within a predetermined range so as not to come out of the notch 123 of the fan shroud 21. In addition, since the intake pipe 23 passing through the notch 123 and members passing through the second notch 124 can be attached and detached only by attaching and detaching the closing sheet 125, maintenance of the intake pipe 23 passing through the notch 123 and the first pipe 128 and the second pipe 129 passing through the second notch 124 can be easily performed.

In the tractor 100 according to this embodiment, the closing sheet 125 is disposed to be able to contact the intake pipe 23 (and the engine harness 126). The entire closing sheet 125 can be configured to be deformable.

In this manner, the closing sheet 125 covers the opening of the notch 123 while deforming along the intake pipe 23 and the engine harness 126, and thereby, space around the intake pipe 23 and the engine harness 126 can be suitably covered. As a result, the air-guide effect and the heat shield effect of the fan shroud 21 can be enhanced.

The foregoing description is directed to the preferred embodiment of the present invention, and the configuration described above may be changed, for example, as follows.

The bent portion 21a is not limited to the configuration described above, and may have a horizontal surface projecting toward the DPF 51 so that the horizontal surface supports the pressure difference sensor 65. The bent portion 21a may be omitted so that the pressure difference sensor 65 is fixed to the surface of the fan shroud 21 whose thickness direction is oriented in the longitudinal direction of the tractor.

The pressure difference sensor 65, the first wire connector 73, and the second wire connector 74 are not limited to a configuration in which these members are bolted, and may be configured to be fixed with tightening bands, for example.

The present invention is not limited to the configuration in which the first wire connector 73 is supported by the first rib 83 and the second wire connector 74 is supported by the second rib 84. Alternatively, the first wire connector 73 may be supported by the second rib 84 and the second wire connector 74 may be supported by the first rib 83, as necessary. Only one of the first wire connector 73 and the second wire connector 74 may be fixed to the rib.

In the embodiment described above, the connection terminals at the sensor side (at the side toward the oxidation catalyst temperature sensor 63 and the filter temperature sensor 64) of the first wire connector 73 and the second wire connector 74 are fixed to the first rib 83 and the second rib 84, respectively. Alternatively, the connection terminals at the side toward the ECU 25 may be fixed to the first rib 83 and the second rib 84.

In this embodiment, the DPF 51 is disposed in an upper left portion of the engine 5, and the exhaust holes 90 of the hood 9 are formed at a location on the left side surface of the hood 9 near the DPF 51. Alternatively, the configuration may be changed such that the DPF 51 is disposed in an upper right portion of the engine and the exhaust holes 90 are formed at a location on the right side surface of the hood 9 near the DPF 51.

The shape of the exhaust holes 90 is not limited to the shape illustrated in FIG. 1, for example, and may be changed as appropriate. The exhaust holes 90 are not necessarily formed in one of the left and right side surfaces of the hood 9 and may be formed in both of the side surfaces.

In the embodiment described above, the air cleaner 27 is fixed to the left side of the support bracket 121 and the sub-tank 26 is fixed to the right side of the support bracket 121. Alternatively, the configuration may be changed such that the positions at which the air cleaner and the sub-tank 26 are fixed to the support bracket 121 may be replaced with each other in the lateral direction.

In the embodiment described above, the upper end of the support rod 122 is fixed to the support plate 132. Alternatively, the support rod 122 may not be fixed to the support plate 132. The support rod 122 may be fixed directly to the condenser frame 24a. Alternatively, the support rod 122 may be omitted so that the support bracket 121 is fixed directly to the condenser frame 24a, for example.

The position and the shape of the notch 123 may be changed as appropriate. For example, the notch 123 may be formed by cutting laterally or obliquely, or may be formed into an L shape. A plurality of second notches 124 may be provided or no second notches 124 may be provided.

In the embodiment described above, the entire closing sheet 125 is configured to be deformable. Instead of this configuration, only a part of the closing sheet 125 that contacts the intake pipe 23 or the engine harness 126 (e.g., only the lower end thereof) may be deformable. Instead of the soft closing sheet 125, the opening of the notch 123 may be closed with a hard member made of a metal or a resin, for example.

Instead of, or in addition to, the engine harness 126, another slender member may pass through the notch 123. The second notch 124 may be configured to allow a slender member except the first pipe 128 and the second pipe 129 to pass therethrough. Examples of the slender members disposed in the notch 123 and the second notch 124 include a pipe and a wire harness.

The member disposed immediately above the restriction part 31b of the upper restriction member 31 may be a member except the intake pipe 23 and the hose 26a (e.g., a wire).

In the configuration of the embodiment described above, the dust screen 30 can be drawn out from the left side. The present invention, however, is not limited to this configuration, and the dust screen 30 may be drawn out from the right side.

The present invention is not limited to tractors, and is applicable to various work vehicles such as a transplanter, a combine harvester, and a wheel loader.

REFERENCE SIGNS LIST 5 engine
21 fan shroud
21a bent portion
23 intake pipe
25 control section (ECU)
51 exhaust gas purifier (DPF)
61 oxidation catalyst
62 soot filter (filter)
63 oxidation catalyst temperature sensor (temperature sensor)
64 filter temperature sensor (temperature sensor)
65 pressure difference sensor
73 first wire connector (wire connector)
74 second wire connector (wire connector)
81 upstream pipe (pipe)
82 downstream pipe (pipe)
83 first rib (support part)
84 second rib (support part)
91 wire
92 wire
100 tractor

The invention claimed is:

1. A work vehicle comprising:
an engine including an exhaust gas purifier configured to purify exhaust gas; and
a fan shroud disposed ahead of the engine, wherein
the exhaust gas purifier includes a filter configured to collect particulate matter in the exhaust gas,
the engine further includes a pressure difference sensor configured to detect a pressure difference between an upstream side and a downstream side of the filter of the exhaust gas purifier in a direction in which the exhaust gas flows, and
the pressure difference sensor is supported by the fan shroud.

2. The work vehicle according to claim 1, wherein
the engine further includes a pipe connecting the upstream and downstream sides of the filter of the exhaust gas purifier to the pressure difference sensor,
a part of an upper portion of the fan shroud includes a bent portion that bends toward the exhaust gas purifier, and
the pressure difference sensor is supported by the bent portion.

3. The work vehicle according to claim 1, wherein
the engine further includes
an intake pipe configured to guide air sucked from outside,
a temperature sensor configured to detect a temperature of the exhaust gas in the exhaust gas purifier, and
a control section configured to receive a detection result of the temperature sensor,
a wire connector is disposed in an intermediate portion of a wire from the temperature sensor to the control section, and
the wire connector is supported by the intake pipe.

4. The work vehicle according to claim 3, wherein
at least a part of the intake pipe is disposed near the exhaust gas purifier along a longitudinal direction of the exhaust gas purifier,
the intake pipe includes a support part integrally formed to project toward the exhaust gas purifier, and
the wire connector is supported by the support part of the intake pipe.

5. The work vehicle according to claim 4, wherein
the support part has a rib shape.

6. The work vehicle according to claim 1, further comprising
a hood, wherein
the exhaust gas purifier is attached to an upper portion of the engine,
the hood includes an exhaust hole at a position where the exhaust hole at least partially overlaps with the exhaust gas purifier in a side view,
the exhaust gas purifier is disposed at a position close to one side relative to a lateral center in the hood, and
the exhaust hole is formed in at least one of left and right side walls of the hood on which the exhaust gas purifier is disposed.

7. The work vehicle according to claim 6, wherein
the exhaust gas purifier has a cylindrical shape whose axial length is larger than a diameter of the exhaust gas purifier, and
an axial direction of the exhaust gas purifier is parallel to a longitudinal direction of the work vehicle.

8. The work vehicle according to claim 6, wherein
the fan shroud is disposed ahead of the exhaust gas purifier, and
an air cleaner is disposed ahead of the fan shroud.

9. The work vehicle according to claim 8, wherein
the air cleaner is fixed to a support bracket disposed ahead of the fan shroud, and
a sub-tank configured to store cooling water for a radiator is fixed to the support bracket.

10. The work vehicle according to claim 9, wherein
the support bracket tilts to one of left and right toward a front in a plan view, and
the air cleaner tilts along an orientation of the support bracket in a plan view.

* * * * *